(12) United States Patent
El-Beltagy et al.

(10) Patent No.: US 9,591,070 B2
(45) Date of Patent: *Mar. 7, 2017

(54) MULTIPLE REQUESTS FOR CONTENT DOWNLOAD IN A LIVE STREAMING P2P NETWORK

(71) Applicant: Hive Streaming AB, Stockholm (SE)

(72) Inventors: Mohammed El-Beltagy, Stockholm (SE); Amgad Naiem, Stockholm (SE); Fouad Essayadi, Stockholm (SE)

(73) Assignee: Hive Streaming AB, Stockholm (SE)

( * ) Notice: Subject to any disclaimer, the term of this patent is extended or adjusted under 35 U.S.C. 154(b) by 573 days.

This patent is subject to a terminal disclaimer.

(21) Appl. No.: 13/720,445

(22) Filed: Dec. 19, 2012

(65) Prior Publication Data

US 2014/0172979 A1 Jun. 19, 2014

(51) Int. Cl.
*H04L 29/08* (2006.01)

(52) U.S. Cl.
CPC ........ *H04L 67/1046* (2013.01); *H04L 67/108* (2013.01); *H04L 67/1063* (2013.01)

(58) Field of Classification Search
None
See application file for complete search history.

(56) References Cited

U.S. PATENT DOCUMENTS 7,633,887 B2 * 12/2009 Panwar et al. ............... 370/254
7,805,518 B1 9/2010 Kamvar et al.
8,169,916 B1 5/2012 Pai et al.

(Continued)

FOREIGN PATENT DOCUMENTS

EP 1821487 A1 8/2007

OTHER PUBLICATIONS

Small et al., "Scaling Laws and Tradeoffs in Peer-to-Peer Live Multimedia Streaming", ACM Multimedia 2006 & Co-Located Workshops: Oct. 23-27, 2006, Santa Barbara, CA.

(Continued)

*Primary Examiner* — Ninos Donabed
(74) *Attorney, Agent, or Firm* — Volpe and Koenig, P.C.

(57) ABSTRACT

The present invention relates to a method of and device for, arranging peers in a P2P network comprising a streaming source and network peers arranged at distribution levels in the P2P network. The method comprises receiving a request from a peer entering the network to receive data content and determining a distribution level in the P2P network at which the entering peer is to be arranged with respect to the streaming source. The method further comprises providing the entering peer with a plurality of peers selected from the network peers from which the requested data content can be downloaded with an expected probability depending on the determined distribution level, wherein the entering peer is enabled to download, with the expected probability, the requested data content from a selected one of said plurality of peers, and in case the requested data content cannot be downloaded from said selected peer, the entering peer is enabled to download the requested data content from another selected peer of the plurality of peers with another expected probability.

The present invention further relates to a method of requesting data content in a P2P network and a peer device.

44 Claims, 14 Drawing Sheets

(56) References Cited

U.S. PATENT DOCUMENTS

| | | | |
|---|---|---|---|
| 8,560,607 B2* | 10/2013 | Wang | H04L 29/1249 709/204 |
| 2003/0126199 A1 | 7/2003 | Kadri | |
| 2005/0044147 A1 | 2/2005 | Yap | |
| 2005/0078610 A1 | 4/2005 | Previdi | |
| 2006/0053209 A1 | 3/2006 | Li | |
| 2006/0069800 A1 | 3/2006 | Li | |
| 2006/0080454 A1 | 4/2006 | Li | |
| 2006/0168111 A1* | 7/2006 | Gidwani | 709/218 |
| 2006/0215582 A1* | 9/2006 | Castagnoli et al. | 370/254 |
| 2006/0215583 A1* | 9/2006 | Castagnoli | 370/254 |
| 2007/0025353 A1* | 2/2007 | Nambisan et al. | 370/392 |
| 2007/0028133 A1* | 2/2007 | Izutsu et al. | 714/4 |
| 2007/0110009 A1* | 5/2007 | Bachmann et al. | 370/338 |
| 2007/0127481 A1* | 6/2007 | Park | H04L 65/4092 370/392 |
| 2007/0178908 A1* | 8/2007 | Doyle | 455/456.1 |
| 2007/0280255 A1 | 12/2007 | Tsang | |
| 2007/0294422 A1 | 12/2007 | Zuckerman et al. | |
| 2008/0104218 A1* | 5/2008 | Liang | H04L 41/0677 709/223 |
| 2008/0133767 A1* | 6/2008 | Birrer | H04L 65/4076 709/231 |
| 2008/0140853 A1* | 6/2008 | Harrison | H04L 47/10 709/231 |
| 2008/0261580 A1* | 10/2008 | Wallentin et al. | 455/418 |
| 2008/0291822 A1* | 11/2008 | Farkas et al. | 370/216 |
| 2009/0034434 A1 | 2/2009 | Tsang | |
| 2009/0164576 A1 | 6/2009 | Noh | |
| 2009/0182815 A1 | 7/2009 | Czechowski et al. | |
| 2009/0202221 A1* | 8/2009 | Guo | H04N 7/17318 386/343 |
| 2009/0234917 A1 | 9/2009 | Despotovic et al. | |
| 2009/0265473 A1* | 10/2009 | Hydrie | H04L 67/104 709/229 |
| 2010/0030909 A1* | 2/2010 | Magharei | H04L 29/06027 709/231 |
| 2010/0064049 A1* | 3/2010 | Magharei | H04L 67/104 709/229 |
| 2010/0146092 A1 | 6/2010 | Hu et al. | |
| 2010/0146569 A1 | 6/2010 | Janardhan et al. | |
| 2010/0235432 A1* | 9/2010 | Trojer | 709/203 |
| 2011/0083015 A1* | 4/2011 | Meier | H04L 9/3236 713/176 |
| 2011/0131278 A1* | 6/2011 | Nieh | H04L 67/104 709/204 |
| 2011/0153835 A1 | 6/2011 | Rimac | |
| 2011/0219137 A1* | 9/2011 | Yang | H04L 29/12103 709/231 |
| 2012/0110609 A1* | 5/2012 | Guo | H04N 21/234327 725/14 |
| 2012/0151051 A1 | 6/2012 | Zhang et al. | |
| 2012/0170476 A1* | 7/2012 | Chen | H04L 12/1863 370/252 |
| 2012/0221640 A1 | 8/2012 | Cohen | |
| 2013/0066969 A1 | 3/2013 | Cohen | |
| 2013/0091294 A1* | 4/2013 | El-Beltagy | H04L 67/1046 709/231 |

OTHER PUBLICATIONS

Vlavianos, Angelos, Marias Iliofotou, and Michalis Faloutsos. "BiToS: Enhancing BitTorrent for supporting streaming applications." INFOCOM 2006. 25th IEEE International Conference on Computer Communications. Proceedings. IEEE, 2006.

Zhou, Yipeng, Dah-Ming Chiu, and John CS Lui. "A simple model for chunk-scheduling strategies in P2P streaming." Networking, IEEE/ACM Transactions on 19.1 (2011): 42-54.

Zhang, Xinyan, et al. "CooiStreaming/DONet: a data-driven overlay network for peer-to-peer live media streaming." INFOCOM 2005. 24th Annual Joint Conference of the IEEE Computer and Communications Societies. Proceedings IEEE. vol. 3. IEEE, 2005.

Ren, Dongni, Y-Th Li, and S-Hg Chan. "Fast-mesh: a low-delay high-bandwidth mesh for peer-to-peer live streaming." Multimedia, IEEE Transactions on 11.8 (2009): 1446-1456.

Ren, Dongni, Y-Th Li, and S-Hg Chan. "On reducing mesh delay for peer-to-peer live streaming." INFOCOM 2008. The 27th Conference on Computer Communications. IEEE. IEEE, 2008.

Adler, Micah, et al. "Optimal peer selection for P2P downloading and streaming." INFOCOM 2005. 24th Annual Joint conference of the IEEE Computer and Communications Societies. Proceedings IEEE vol. 3. IEEE, 2005.

Zhao, Bridge Qiao, John Chi-Shing Lui, and Dah-Ming Chiu. "Exploring the optimal chunk selection policy for data-driven P2P streaming systems." Peer-to-Peer Computing, 2009. P2P'09. IEEE Ninth International Conference on IEEE, 2009.

S. Tang, H. Wang, and P. Van Mieghem, "The Effect of Peer Selection with Hopcount or Delay Constraint on Peer-to-Peer Networking;" http://link.springer.com/chapter/10.1007/978-3-540-79549-0_31, May 5, 2008.

Lou, Xiaosong, and Kai Hwang. "Quality of data delivery in peer-to-peer video streaming." ACM Transactions on Multimedia Computing, Communications, and Applications (TOMM) 8.1S (2012): 12.

Wu, Yunnan, Saumitra M. Das, and Ranveer Chandra. "Routing with a Markovian metric to promote local mixing." Infocom 2007. 26th IEEE International Conference on Computer Communications. IEEE. IEEE, 2007.

Richarme, Michael, "Eleven Multivariate Analysis: Techniques Key Tools in Your Marketing Research Survival Kit" http://www.decisionanalyst.com/Downloads/MultivariateAnalysisTechniques.pdf, 2002.

Wang, Yao, and Julita Vassileva. "Bayesian network trust model in peer-to-peer networks." Agents and Peer-to-Peer Computing. Springer Berlin Heidelberg, 2003. 23-34.

\* cited by examiner

MULTIPLE REQUESTS FOR CONTENT DOWNLOAD IN A LIVE STREAMING P2P NETWORK

TECHNICAL FIELD

The invention relates to a method of arranging peers in a P2P network and a device for arranging peers in a P2P network, as well as a method for a peer device to request download of content, and a peer device.

BACKGROUND

For live video streaming in a client-server approach, the video stream is downloaded from the streaming server (i.e. the source of content to be streamed) to the client. A video stream consists of a set of consecutive data pieces, or data subset, that the client periodically requests in order to play the video. A scalable live streaming service requires high streaming server bandwidth to satisfy an increasing number of clients over the internet. In order to reduce the cost of the streaming server, Peer-to-peer (P2P) live streaming has been developed. The basic concept of P2P live streaming is to make the clients, referred to as peers in this context, share the load with the streaming server.

P2P live streaming systems has gained a lot of interest in the recent years as it has the advantage of allowing a streaming source to broadcast e.g. a live video event to a large number of peers, without having to provide all the required bandwidth. This is done by making use of the peers' upload capacity to assist the streaming source in broadcasting the content to the peers.

P2P networks comprise any networks composed of entities that each provides access to a portion of their resources (e.g., processing capacity, disk storage, and/or bandwidth) to other entities. The P2P concept differs from traditional client/server architecture based networks where one or more entities (e.g., computers) are dedicated to serving the others in the network. Typically, entities in a P2P network run similar networking protocols and software. Applications for P2P networks are numerous and may for example comprise transporting and/or storing data on the Internet, such as video distribution for content owners.

Many approaches have been developed to efficiently make use of the upload capacity of the peers. These approaches can be divided into two main categories.

Tree-based systems are based on constructing one or more structured trees in an overlay network where peers at the top of each tree feed the peers below them. This approach works well when the peers do not join or leave the system at high frequency as data flow is achieved without any further messages between the peers. However, in a high churn environment, tree maintenance can be very costly and sometimes destruction and reconstruction of the tree(s) are necessary.

Mesh-based systems do not enforce a tree construction, or in other words peer connectivity does not form a specified overlay, and they are connected to each other in an unstructured manner. They exchange data through so called gossip communication or by sending data request messages to each other. A disadvantage with mesh-based systems is that they can have a long setup time, as nodes need to negotiate with each other to find peers. However, many systems use the mesh-based approach as it is very robust to high churn. In such systems each peer has a number of neighbours that it potentially downloads from and failure of any neighbour is thus not as critical as in tree-based approaches.

Although individual peers take decisions locally without a global view in the mesh-based approaches, they can still reach comparable savings to tree based approaches when peer churn is considered, mainly since they do not have to carry the heavy overhead of maintaining a view of the global connectivity structure.

In a decentralized P2P live streaming network, each peer has k neighbouring peers from which it can attempt to download data content. Thus, the peer will try to find a neighbouring peer that it can download from instead of downloading the data content from the streaming server. Given such a prior art overlay network, if the peers start streaming data content from the same point in time, all the peers will not find an uploading peer that has useful content. Hence, almost all the peers will download from the streaming server, which ultimately leads to minimal savings in streaming server bandwidth utilization.

SUMMARY

An object of the present invention is to solve or at least mitigate these problems in the art of how to increase streaming server savings in P2P live streaming networks.

This object is attained in a first aspect of the present invention by a method of arranging peers in a P2P network comprising a streaming source and network peers arranged at distribution levels in the P2P network. The method comprises receiving a request from a peer entering the network to receive data content and determining a distribution level in the P2P network at which the entering peer is to be arranged with respect to the streaming source. The method further comprises providing the entering peer with a plurality of peers selected from the network peers from which the requested data content can be downloaded with an expected probability depending on the determined distribution level, wherein the entering peer is enabled to download, with the expected probability, the requested data content from a selected one of said plurality of peers, and in case the requested data content cannot be downloaded from said selected peer, the entering peer is enabled to download the requested data content from another selected peer of the plurality of peers with another expected probability.

This object is attained in a second aspect of the present invention by a device for arranging peers in a P2P network comprising a streaming source and network peers arranged at distribution levels in the P2P network. The device comprises a processing unit being arranged to receive a request from a peer entering the network to receive data content, and determine a distribution level in the P2P network at which the entering peer is to be arranged with respect to the streaming source. The processing unit is further arranged to provide the entering peer with a plurality of peers selected from the network peers from which the requested data content can be downloaded with an expected probability depending on the determined distribution level, wherein the entering peer is enabled to download, with the expected probability, the requested data content from a selected one of said plurality of peers, and in case the requested data content cannot be downloaded from said selected peer, the entering peer is enabled to download the requested data content from another selected peer of the plurality of peers with another expected probability.

This object is attained in a third aspect of the present invention by a method of requesting data content in a P2P network comprising a streaming source and a plurality of network peers arranged at distribution levels in the P2P network. The method comprises sending, from an entering peer, a request to a network supervising entity to receive data content, and receiving an indication of a distribution level at which the entering peer is to be arranged with respect to the streaming source, and a list indicating a plurality of peers selected from the network peers from which the requested data content can be downloaded with an expected probability depending on the determined distribution level. The method further comprises sending a download request to a selected one of said plurality of peers, and in case the requested data content cannot be downloaded from said selected peer, sending the download request to another selected peer of the plurality of peers from which the requested data content can be downloaded with another expected probability, and downloading the requested data content from said another selected peer with said another expected probability.

This object is attained in a fourth aspect of the present invention by a peer device for requesting data content in a P2P network comprising a streaming source and a plurality of network peers arranged at distribution levels in the P2P network. The peer device comprises a processing unit being arranged to send a request to a network supervising entity to receive data content, and to receive an indication of a distribution level at which the peer device ($p_i$) is to be arranged with respect to the streaming source, and a list indicating a plurality of peers selected from the network peers from which the requested data content can be downloaded with an expected probability depending on the determined distribution level. The processing unit is further arranged to send a download request to a selected one of said plurality of peers, and in case the requested data content cannot be downloaded from said selected peer, send the download request to another selected peer of the plurality of peers from which the requested data content can be downloaded with another expected probability, and to download the requested data content from said another selected peer with said another expected probability.

The concept of multiple requests is introduced throughout the embodiments of the present invention. Instead of selecting one of the neighbouring peers as recipient of a download request, and falling back on the streaming source if the download request cannot be satisfied by the selected neighbouring peer because of lack of available bandwidth, or if the selected neighbouring peer simply not is arranged at a level lower than that of the entering peer. If for any one of these reasons the download request cannot be satisfied by the selected neighbouring peer, the entering peer will send the download request to another one of the neighbouring peers included on the list of k peers provided by the tracker. If this particular neighbouring peer does not have available bandwidth, the entering peer will send the download request to a further neighbouring peer included in the list, and so on, until the entering peer is considered to have depleted its requests, whereupon it will fall back on the streaming source for the requested content. In practice, the tracker may have to stipulate an upper limit for the number of download requests that can be made to different neighbouring peers, as the delay from the time of sending the first download request to the point in time when the requested content actually can be rendered by the entering peer may become unacceptably long.

Thus, by allowing multiple download attempts directed to neighbouring peers, in case a selected neighboring peer is prevented from uploading the requested data content, either due to exceeded latency requirements or due to lack of free upload capacity, a further neighbouring peer is advantageously approached and a download request is made to the further neighbouring peer. Should the further neighbouring peer be prevented from uploading the requested data, still a further neighbouring peer is approached, and so on. This will ultimately increase the expected probability that an entering peer actually will download the requested data content from any one of the k neighbouring peers on the list provided by the tracker. Analogously, the risk of having the entering peer fall back on the streaming server for requested data decreases, and the savings are consequently increased.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
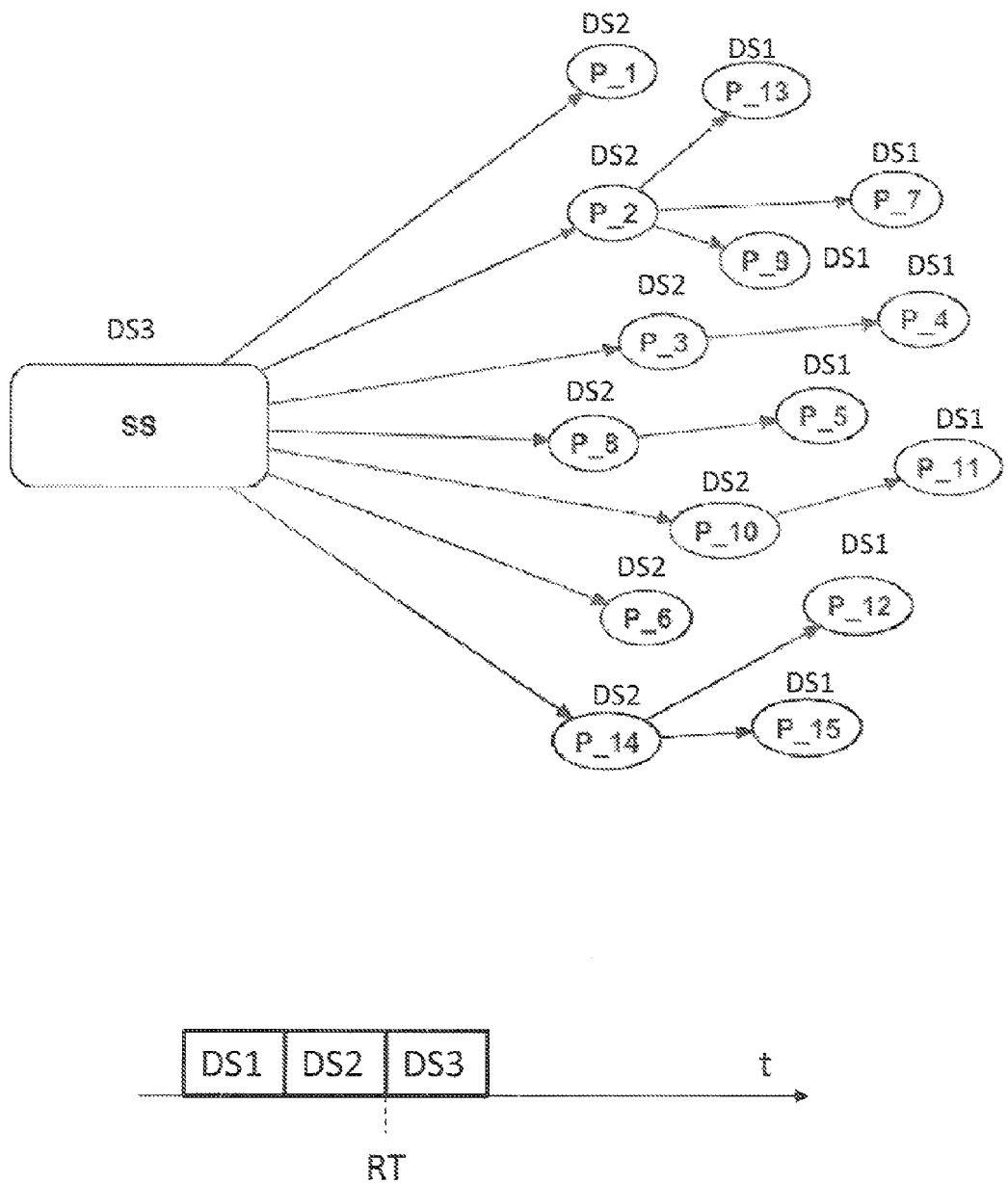
FIG. 1 illustrates data streaming in a prior art live streaming P2P network.

FIG. 1 shows a prior art P2P overlay network with peers $p_1$-$p_{15}$ (in practice peer devices such as television sets, mobile phones, computers, etc.) randomly connected to a streaming source in the form of a streaming server SS. Streaming source and streaming server will be used alternately throughout the application to denote the same network element. The streaming server distributes data content divided into smaller pieces of data that are streamed to the network peers. Thus, the data content is divided into consecutive pieces of data referred to as data subsets throughout this application. This is illustrated in the lower section of FIG. 1, where the data content is divided into smaller data subsets DS1-DS3. Once the streaming source SS has "packeted" a data subset DS, it can be submitted to a peer, which then can start playback of the data subset while the streaming source produces the next data subset. In FIG. 1, the streaming server uploads data subset DS1 to peers $p_1$, $p_2$, $p_3$, $p_6$, $p_8$, $p_{10}$ and $p_{14}$, wherein playback of DS1 may resume at each respective peer and/or further distribution of DS1 may be effected by the respective peer to further downstream peer(s). Further, the streaming server produces data subset DS2 and uploads data subset DS2 to the peers $p_1$, $p_2$, $p_3$, $p_6$, $p_8$, $p_{10}$ and $p_{14}$, while peer $p_2$ uploads the latest fully downloaded data subset DS1 to peers $p_7$, $p_9$ and $p_{13}$, peer $p_3$ uploads DS1 to peer $p_4$ and so on.

Hence, in such a prior art P2P live streaming network, each peer entering the network will ask a tracker (not shown) for the latest data subset to start streaming from as well as k random peers to be its neighbours. Then, the entering peer will turn to its neighbours for the latest subset of data, and if it finds the required data subset on any neighbouring peer, it will start streaming from that neighbouring peer. As has been explained in the above, due to network delay and asynchronicity, the entering peer will be delayed by at least the full duration of one data subset from its uploader and at least twice that from the streaming server on condition that the entering peer's uploader is delayed by at least the full duration of one data subset from the source. In other words, with respect to a real-time playback point RT of the data content distributed by the streaming source, the entering peer will have a latency of at least two data subsets, while its uploader will have a latency of at least one data subset. If the entering peer cannot find the latest data subset on one of its neighbouring peers, it will download it from the streaming server. As compared to a traditional client-server network, where the server distributes content to all clients in the network, savings in streaming server load of the P2P network in FIG. 1 is 8/15=0.53. That is, instead of streaming content to all 15 peers, the streaming server SS streams content to seven of the peers, which in their turn unload the server by streaming content to the remaining eight peers.

Figure 2A:
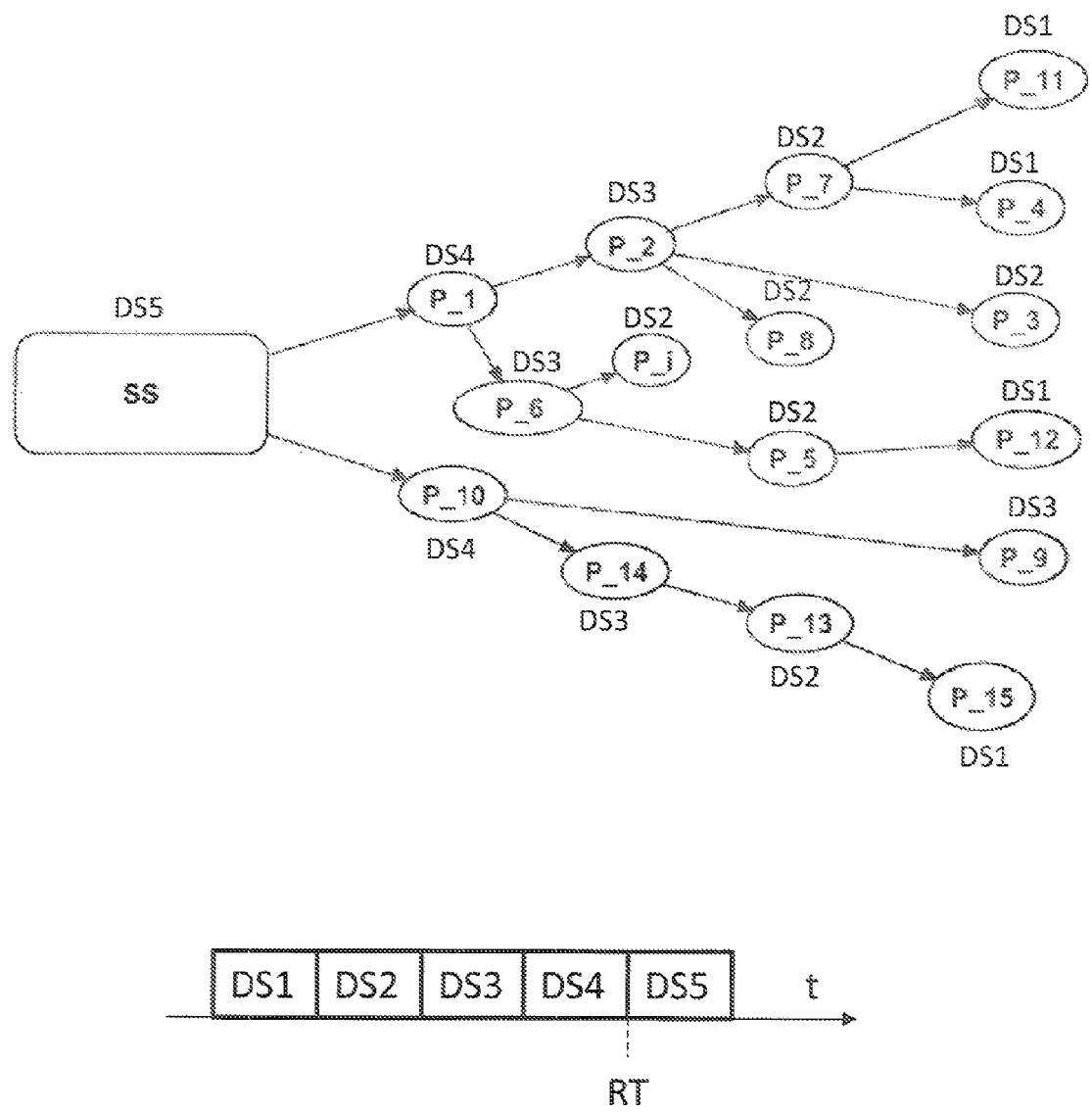
FIGS. 2a and b illustrate data streaming in a live streaming P2P network in which the present invention may be applied.

Now, with reference to FIG. 2a this could further be improved to attain even higher savings. A new peer $p_i$ is entering the network and requests the tracker (not shown) to receive data content originally streamed from the streaming source SS. The tracker determines that the latency, with respect to a real-time playback point RT of the data content distributed by the streaming source, with which the entering peer is to receive the data content is $d_i$ time units, i.e. the entering peer will receive and be able to playback a data subset $d_i$ time units after the same data subset have been rendered in real-time by the streaming source. The tracker will then provide the entering peer with a list of randomly selected peers from which the data content can be downloaded. This list of peers is derived or sampled from a probability density function for the peer as a function of latency. Thus, the entering peer $p_i$ is enabled to download, from a selected subset of the listed peers having a lower latency than that determined for the entering peer, the data content with the determined latency $d_i$ with respect to the real-time playback point RT of the streaming source SS.

With reference again to FIG. 2a, the data subset which is rendered by the streaming source SS in real-time when the peer $p_i$ enters the network is DS5. Assuming for example that the determined latency $d_i$ is 3 units and expressed in a resolution of data subset durations, i.e. the determined latency is three full data subsets, and the list provided by the tracker to the entering peer $p_i$ comprises peers $p_2$, $p_5$, $p_6$, $p_7$ and $p_8$ (in practice this number is substantially higher), the entering peer $p_i$ can find the required data subset DS2 at either peer $p_2$ or $p_6$, being the latest fully downloaded data subset stored in a playback buffer of $p_2$ and $p_6$, respectively. Hence, DS2 is the latest data subset that can be uploaded by peer $p_2$ and $p_6$. In this particular example, since peer $p_2$ is uploading to three other peers, it may be preferred that the entering peer $p_i$ downloads from $p_6$. It should be noted that the entering peer cannot download from either one of $p_5$, $p_7$ or $p_8$, since they all are rendering data subset DS2 at the moment peer $p_i$ is entering the network. Thus, the latest fully downloaded data subset stored in the respective playback buffer of $p_5$, $p_7$ and $p_8$, is data subset DS1. In this context, an alternative definition of "latency" will be introduced. As can be seen in FIG. 2a, the determined latency $d_i$ for the entering peer $p_i$ is 3 units. Thus, the entering peer is placed at a third "distribution level" in the P2P network. Further, peers $p_1$ and $p_{10}$ reside at the first level (the streaming server SS is always at level zero), while peers $p_2$, $p_6$ and $p_{14}$ are positioned in the second layer, and so on. A distribution level in a P2P network is occasionally referred to as a "distribution layer". Thus, a network peer will download data content from a peer on a higher distribution level, i.e. an upstream peer, while the network peer will upload data content to a peer on a lower distribution level, i.e. a downstream peer. Hence, a peer placed on level 2 (i.e. d=2) will download data from either peers placed on level 1 (i.e. at d=1) or the streaming source itself (located at d=0). Correspondingly, a peer placed on level 2 (i.e. d=2) will upload data to either peers placed on level 3 (i.e. d=3) or peers placed further downstream (i.e. d≥4).

It should be noted that in most P2P networks for livestreaming peers, the peers have a buffer that allows for continuous playback even if there are some interruptions in the downloaded data pieces. In fact, a given distribution level may contain peers which are slightly behind or ahead (due to e.g. delay variations and asynchronicity) the other peers at the same level in terms of absolute latency, but still within a carefully chosen tolerance such that it safely can be asserted that, with respect to playback of the peers that are positioned at the next downstream level, all peers at the upstream level always possess content that is useful for the downstream uploaders in a manner that will not induce playback interruptions.

As compared to a traditional client-server network, savings in streaming server load of the P2P network in FIG. 2a is 13/15=0.87. That is, instead of streaming content to all 15 peers, the streaming source SS streams content to two of the peers, which in their turn relieve the source from load by streaming content to the remaining 13 peers.

In the example, the determined latency with which an entering peer downloads data content with respect to a real-time playback point RT of the data content distributed by the streaming source is represented by time units equivalent to the duration of a data subset. As an example, if in a P2P network the duration of a distributed data subset is 300 ms, a latency of one unit implies that a peer downloads a data subset 300 ms after the same data subset has been rendered by the streaming source. Thus, the downloading peer is located at a first distribution level, i.e. the first level downstream from the streaming source. In practice, there may be some fluctuation in the latencies. Thus, in line with that described in the above, a peer with a latency in the range 250-350 ms could be positioned at the first level, a peer with a latency in the range 550-650 ms could be positioned at the second level, etc.

Figure 2B:
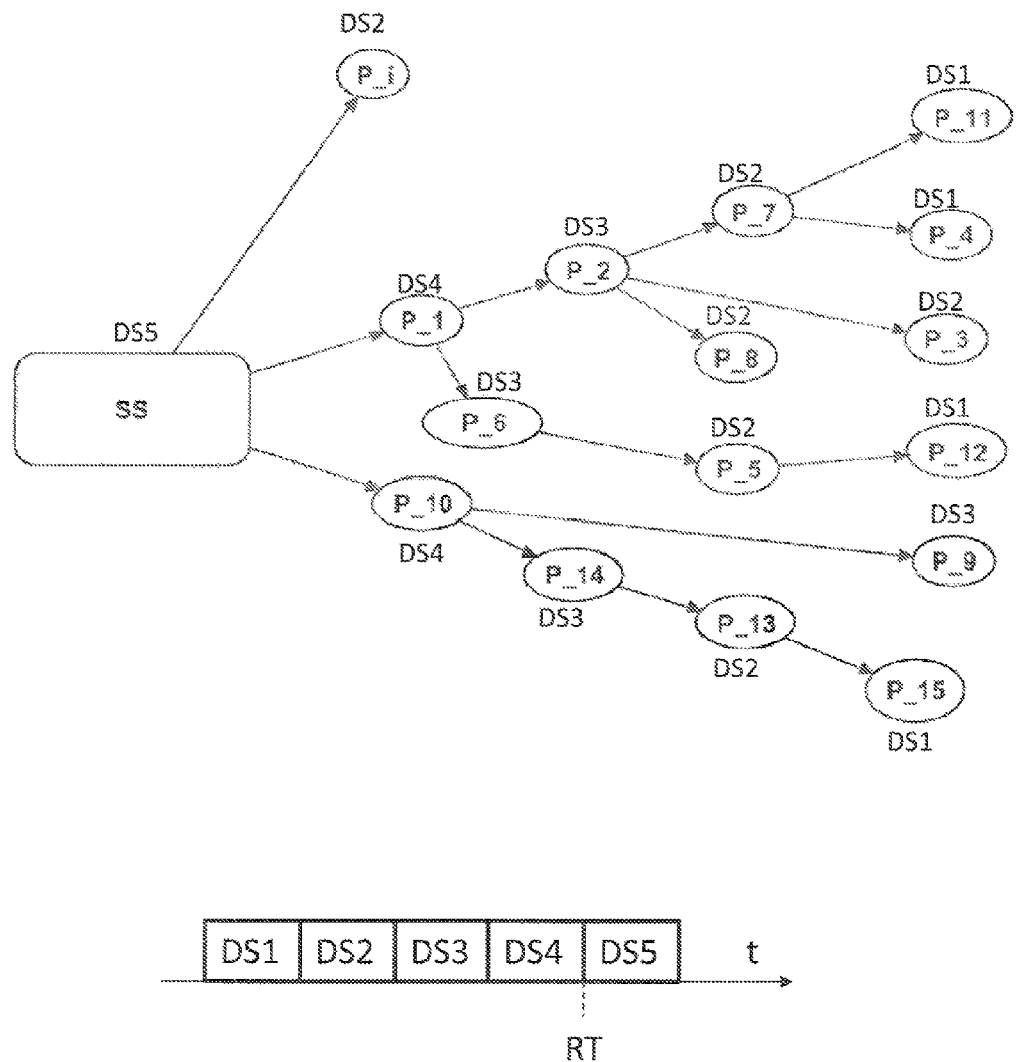

FIG. 2b illustrates a further example, where the tracker (not shown) again determines that the entering peer $p_i$ should be placed at the third distribution level, i.e. $d_i=3$. In this particular example, the list provided by the tracker to the entering peer $p_i$ comprises peers $p_3$, $p_4$, $p_7$, $p_8$ and $p_{11}$. In this case, with the entering peer $p_i$ placed at the third level, it cannot find the required data subset DS2 at either of the listed peers. For peers $p_4$ and $p_{11}$, the latest fully downloaded data subset stored in the respective playback buffer is DS0, while peers $p_3$, $p_7$ and $p_8$ have DS1 as the latest fully downloaded data subset. Thus, none of the listed peers can upload the required data subset DS2 to the entering peer, which has as a consequence that the entering peer must turn to the streaming source SS for the required data subset.

Figure 3:
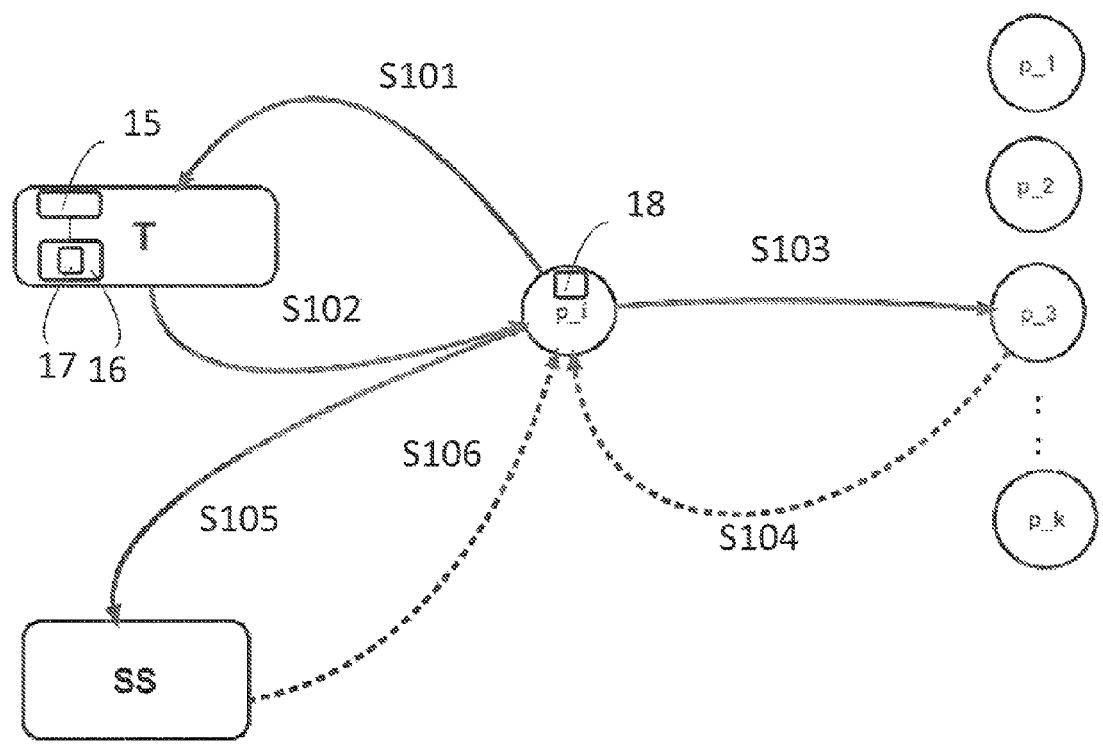
FIG. 3 illustrates the function of a tracker in which the method of an aspect of the present invention may be applied.

FIG. 3 shows a P2P network in which embodiments of the present invention could be implemented, which Figure further illustrates the teachings set forth in connection to FIGS. 2a and 2b. Continuous lines denote request/reply messages, while dashed lines denote streaming channels. A new peer $p_i$ enters the network and requests the tracker T in step S101 via its communication interface CI to receive data content originally streamed from the streaming source SS. The tracker determines the level at which the entering peer $p_i$ is to be arranged and provides in step S102 the entering peer with a list of k randomly selected peers from which the data content can be downloaded. Thus, the entering peer requests in step S103 one of the peers on the list to supply it with the latest subset of data given the determined network level for the entering peer. If there exists at least one peer out the k randomly selected peers which is arranged at a level closer to the streaming source than that determined for the entering peer, the requested data content will be uploaded in step S104 to the entering peer with some given probability. In FIG. 3, peer $p_3$ uploads the requested data content to the entering peer $p_i$. Depending on how the level for the entering peer is selected, the probability that a peer can upload the requested data content to the entering peer in step S104 can be increased. If no randomly selected peer exists which is located at a level closer to the source than that determined for the entering peer, i.e. all k peers are at level which is equal to or further downstream that the level that is determined for the entering peer, the requested data content cannot be uploaded in step S104 to the entering peer. In that case, the entering peer will in step S105 turn to the streaming server SS for the requested data content, which in its turn will upload the requested data content to the entering peer in step S106. Analogously, depending on how the level for the entering peer is selected, the probability that the streaming server will have to upload the requested data content to the entering peer in step S106 can be decreased. These probabilities will be discussed in detail later on in the detailed description.

The tracker determines the delay $d_i$ when an entering peer is to receive the content data, with respect to a real-time playback point RT of the data content uploaded by the streaming source SS on the basis of statistical information. The behaviour of a P2P network in which the present invention is implemented is stochastic, which is based on currently streaming network peers. Thus, statistical information should be considered such that a probability distribution that represents the behaviour of peers in the P2P live streaming network can be formed. Given the probability distribution p(d) of the distribution levels of the peers with respect to the streaming server, expected savings in the streaming server bandwidth load can be calculated. Thus, by setting a level which follows the distribution p(d) for each entering peer, the savings of the stream server will approach the expected savings calculated using the said distribution. Or to put it in another way: by determining an appropriate level at which the entering peer is to be arranged in the network, the probability that a network peer can be found from which the entering peer can download requested data content can be increased. Thus, the savings in the streaming server bandwidth is directly related to the probability that a network peer can upload requested data content to the entering peer.

With reference to FIG. 3, the tracker T for performing the method of arranging peers in a P2P network according to embodiments of the present invention, as well as the peer device $p_i$ according to embodiments of the invention, are typically equipped with one or more processing units 15, 18 embodied in the form of one or more microprocessors arranged to execute a computer program 17 downloaded to a suitable storage medium 16 associated with the microprocessor, such as a Random Access Memory (RAM), a Flash memory or a hard disk drive. The processing unit 15 is arranged to at least partly carry out the method according to embodiments of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a compact disc or a memory stick. As a further alternative, the computer program 17 may be downloaded to the storage medium 16 over a network. The processing unit 15 may alternatively be embodied in the form of an application specific integrated circuit (ASIC), a field-programmable gate array (FPGA), a complex programmable logic device (CPLD), etc.

Figure 4:
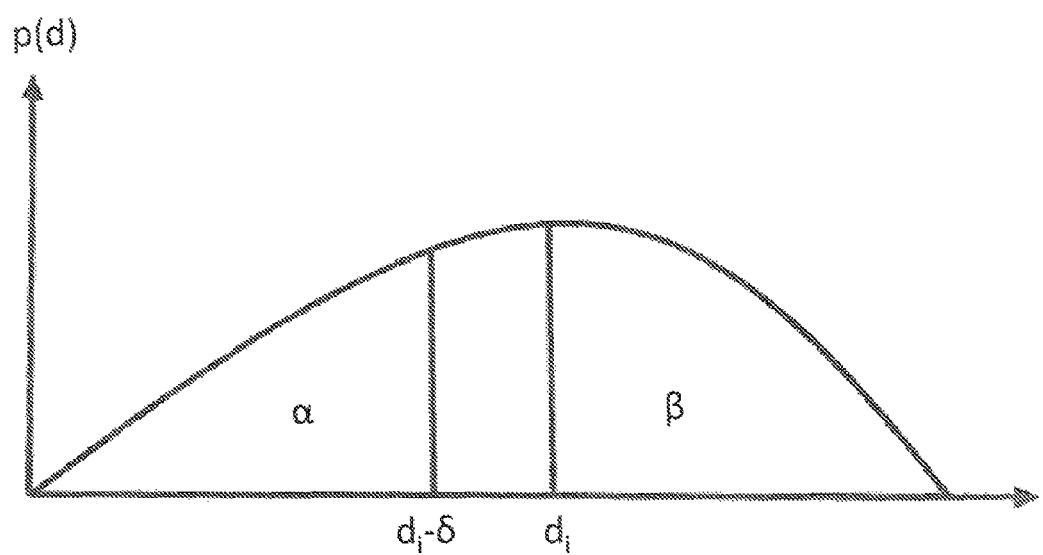
FIG. 4 illustrates a probability distribution of network peers latencies with respect to a real-time playback point of a streaming source.

Reference is made to FIG. 4, which shows an assumed shape for the distribution of the distribution level with respect to the streaming source. As the distribution of level values is controlled by the tracker, a relationship between the expected savings and this distribution can be formulated. In a network using a random selection policy, any entering peer i, having k randomly selected neighbors and being arranged at a certain level $d_i$ with respect to the streaming source determined by the tracker will search among its neighbors for the requested data content, i.e. the data subset which was rendered in real-time at the streaming source $d_i$ data subsets earlier, see FIGS. 2a and 2b. If it does not find the particular data subset, it will request it from the streaming server incurring a cost to the streaming server bandwidth. This undesired situation occurs when the k neighbours having the latest fully downloaded data subset are at a level equal to or further downstream that determined for the entering peer, i.e. fall in region β or the region defined by $d_i$-δ to $d_i$ of the distribution p(d).

On the other hand, if one of the k neighbouring peers is arranged at a level that falls in the region α (and has enough bandwidth), then this peer can upload to the entering peer from the requested data subset. Again with reference to FIGS. 2a and 2b, it should be noted that region a is limited by $d_i$-δ, where δ typically amounts to the duration of one data subset. That is, if the entering peer is determined to be arranged at level three, it can download the requested data subset from a peer arranged at level two or closer to the source. Hence, an entering peer can only download from any neighbouring peer that precedes it by at least δ. Consequently, the probability $P_{di}$ for an entering peer that a randomly selected neighbouring peer is in the region a is simply the cumulative distribution function (cdf) value of the random variable d at the value $d_i$-δ:

$$P_{\alpha_i} = cdf(d = d_i - \delta) = \int_0^{d_i-\delta} p(x)dx \qquad (1)$$

Thus, the level $d_i$ of the entering peer can be determined by the tracker using the teachings set forth in Equation (1) such that the requested data content can be downloaded from one of the k randomly selected peers with a sufficiently high probability. Hence, by carefully selecting an appropriate level for the entering peer, the possibility of having the entering peer download from one of its k neighbouring peers can be increased (or decreased, if required). A cost of having the entering peer downloading from a neighbouring peer with a higher probability is that the latency experienced by the entering peer increases. Thus, if for a given P2P live streaming network the probability of successful download from a neighbouring peer already is high, the latency may be selected by the tracker to be low with a still high download probability.

Further, this may be stipulated by a predetermined threshold value which the probability should exceed for the chance that the requested data content could be downloaded from a neighbouring peer should be considered great enough.

It can be envisaged that each peer will be given a list of k randomly selected neighbouring peers, as described hereinabove, in order to ensure that the determined latencies from the real-time playback point will concur with the probability distribution p(d) and thus do not have any bias. Further as has been described in the above, an entering peer will download from the streaming server when the respective latest fully downloaded data subset of each peer among the k neighbouring peers is older than the data subset that the entering peer is requesting. This situation occurs in FIG. 2b, where the tracker determines that the entering peer $p_i$ is to be arranged at $d_i$=3 and the list provided by the tracker to the entering peer $p_i$ comprises peers $p_3$, $p_4$, $p_7$, $p_8$ and $p_{11}$. In this case, the entering peer cannot find the required data subset DS2 at either of the listed peers. For peers $p_4$ and $p_{11}$, the latest fully downloaded data subset stored in the respective playback buffer is DS0, while peers $p_3$, $p_7$ and $p_8$ have DS1 as the latest fully downloaded data subset. Thus, none of the listed peers can upload the required data subset DS2 to the entering peer, since the available data subsets DS1 and DS0 both are older than the requested data subset DS2, which has as a consequence that the entering peer must turn to the streaming source for the required data subset. With reference to FIG. 4, this occurs if all k randomly selected neighbouring peers are placed at a level upstream of the entering peer, i.e. fall in region β of the probability distribution p(d).

The probability that all the k neighbouring peers will be in the region β can be expressed as a binomial experiment, where the probability of attaining zero success trials out of a total number k of trails is determined. By considering success probability as the probability of finding one neighbouring peer that falls in the region α, the probability $P_F$ of finding zero neighbouring peers that belong to region α out of k neighbouring peers can be expressed as a binomial experiment with x=0 as follows:

$$P_F(d_i) = Pr(X = 0 | k, P_{\alpha_i}) = \binom{k}{0} P^0(1 - P_{\alpha_i})^k \qquad (2)$$

$$P_F(d_i) = (1 - P_{\alpha_i})^k$$

Thus, $P_F(d_i)$ expresses the probability that a downloading peer at a determined level $d_i$ will have to stream required data content from the streaming server since no neighbouring peer out of the k randomly selected peers is located in region α of FIG. 4. Analogously, the probability that an entering peer at level $d_i$ will find at least one neighbouring peer out of the k randomly selected peers in region α (from which it may download the requested data content) can be expressed as 1−$P_F(d_i)$. This presents a simple model which the tracker can use to determine level $d_i$ for an entering peer such that data content can be streamed from a neighbouring peer with a certain probability.

However, this does not take into account finite upload capacity of each one of the network peers. A situation may occur where an entering peer at level $d_i$ has found a neighbouring peer out of the k randomly selected peers in region α, but the neighbouring peer cannot upload to the entering peer due to limitations in upload capacity. In an embodiment of the present invention described in the following, the tracker takes into account the finite upload capacity of the network peers.

A discrete probability distribution p(d) will be used since the distribution levels are expressed as discrete values. Thus, the levels take on discrete values [$d_1$, $d_2$, $d_3$, . . . ], where $d_{n+1}$-$d_n$=δ for all n. A discrete probability distribution implies that the expected number of peers at level $d_i$ are $N_i$=p($d_i$)N. For any level $d_j$ the number of download requests from peers at level $d_i$ is, in case the download requests are made to the peers in region α in a random and unbiased manner:

$$R_{ij} = \begin{cases} N_{pi} \dfrac{p(d_j)}{p_{\alpha_i}} & \text{if } d_j \le d_i - \delta \\ 0 & \text{otherwise} \end{cases} \qquad (3)$$

Where $N_{pi}$=(1−$P_F(d_i)$)$N_i$ is the expected number of peers at level $d_i$ that will attempt to download from peers in region α. The reason only a subset $N_{pi}$ of all peers $N_i$ at level $d_i$ will make a successful attempt to download from other peers in region α is that there is a probability that peers at level $d_i$ will have no neighbouring peers in α and hence will have to download from the streaming source.

The total number of download requests that neighbouring peers make to peers at level $d_j$ is thus:

$$R_j = \sum_{i=j+1}^{\infty} R_{ij}$$

In order to find how many of these requests will be satisfied given that the number of peers at level $d_j$ is expressed as $N_j$, each of them having a capacity of u simultaneous uploads, the probability that a peer at level $d_j$ will respond to l requests for download from the total number $R_j$ of download requests as:

$$B_j(l) = \binom{R_j}{l}\left(\frac{1}{N_j}\right)^l\left(1 - \frac{1}{N_j}\right)^{R_j-l} \quad (4)$$

where u is the number of simultaneous uploads per peer and is determined by bandwidth distribution $p_{bw}$ and the streaming bitrate br. The number of simultaneous uploads per peer is thus calculated as $u=p_{bw}/br$. As an example, if a given peer is assigned a bandwidth of 1 Mb/s and the streaming bit rate is 200 kB/s, the peer can simultaneously upload to five other peers.

$B_j(l)$ determines the share of peers at level $d_i$ that will receive l download requests. For l≤u, the number of successful requests will be $l \times B_j(l) \times N_j$, while for l>u, the number of successful requests will be $u \times B_j(l) \times N_j$. Thus, peers at level $d_j$ receive $R_j$ download requests, and each request will fall on one of the plurality $N_j$ of peers randomly, wherein the distribution of download requests can be modelled as a binomial distribution.

Therefore, the expected number of successful responses that peers at level $d_j$ make to random download requests from neighbouring peers (i.e. the load on peers at level $d_j$) is:

$$L_{ju} = \left(\sum_{l=1}^{u} lB_{ju}(l) + u\left(1 - \sum_{l=0}^{u} B_{ju}(l)\right)\right)N_{ju} \quad (5)$$

and hence the expected number of peers streaming from the P2P network is the total number of successful downloads:

$$L = \sum_{j=0}^{\infty} L_j.$$

The probability that a download request which a neighbouring peer makes to peers at level $d_j$ is successful can be calculated as the ratio between the expected number of successful responses and the total number of download requests, i.e. $L_j/R_j$.

Consequently, the probability that a download request from a peer at level $d_j$ will fall in region α is $(1-P_F(d_i))$, i.e. the probability that a peer at level $d_i$ will find at least one neighbouring peer out of the k randomly selected peers in region α from which it may download the requested data content can be expressed as $1-P_F(d_i)$. The probability that one of those requests to peers in region α actually will go to peers at the particular level $d_j$ is $p(d_j)/P\alpha_i$ (deducted from Equation (3) which defines this probability for a number $N_i$ of peers at level $d_i$). These are modelled as independent probabilities, and the probability that a peer at level $d_i$ will be able to download content from a neighbouring peer at a particular level $d_j$ (given the bandwidth limitations) can be expressed as a product of these three probabilities. It then follows that the probability that a peer at a level $d_i$ makes a successful download from the P2P network, i.e. a download from any peer at a level lower than $d_i$, will be expressed as a sum of probabilities:

$$P_s(d_i) = (1 - P_F(d_i))\sum_{j=0}^{j=i-1} \frac{L_j}{R_j}\frac{p(d_j)}{P_{\alpha_i}}, \quad (6)$$

Hence, the summation covers all peers at a level lower than $d_i$ and not only peers at a particular level of $d_j$.

Expected streaming source savings will relate to the probability of successful download by each peer in the network:

$$\text{savings} = \sum_{i=0}^{\infty} P_s(d_i)p(d_i). \quad (7)$$

The savings can however be expressed in a simpler manner as the ratio of successful downloads to the peers in the network and the total number of peers in the network, i.e.:

$$\text{savings} = \frac{L}{N}. \quad (8)$$

This form for calculating the savings is conceptually simpler and computationally more efficient. Both Equations (7) and (8) yield the same result.

To recapitulate, the situation where a downloading peer at a determined level $d_i$ will have to stream required data content from the streaming server occurs if:
 (a) no neighbouring peer out of the k randomly selected peers is located in region α, i.e. no neighbouring peer is arranged at a level of $d_i$-δ or less, or
 (b) one or more neighbouring peers out of the k randomly selected peers are located in region α, but the neighbouring peers cannot upload due to limitations in upload capacity.

Thus, even though one or more neighbouring peers are capable of providing a peer with requested data content, in a single request policy as illustrated in FIG. 3, the peer will still have to revert to the streaming server in case the selected one of the k neighbouring peers is not capable of uploading the requested data content. In many live streaming situations there is little time for the peer to attempt multiple request; in many cases, the customer wants to start viewing the content immediately.

To put it in another way, even though neighbouring peers can be located in region α illustrated in FIG. 4, the located neighbouring peers may be restrained from effecting an upload to the requesting peer due to bandwidth/upload capacity limitations. Equation (6) set forth in the above takes these bandwidth limitations into account and calculates $P_s(d_i)$, i.e. the probability that a peer at a level $d_i$ makes a successful download from the P2P network.

As has been previously described, for instance with reference to FIG. 3, when a peer enters the network, it receives from the tracker a list of k randomly selected neighbouring peers from which requested data content can be downloaded with an expected probability depending on a determined level at which the entering peer is to be arranged with respect to the streaming source. Thus, the entering peer is enabled to download, with the expected probability, the requested data content from a selected one of the k randomly selected peers at a lower level than that determined for the entering peer (i.e. at a level upstream from the entering peer).

The probability that the entering peer is capable of downloading the requested data content from a selected one of the plurality of randomly selected peers it thus determined on the basis of the upload capacity of the peers as well as the determined level at which the entering peer is to be arranged.

Figure 5:
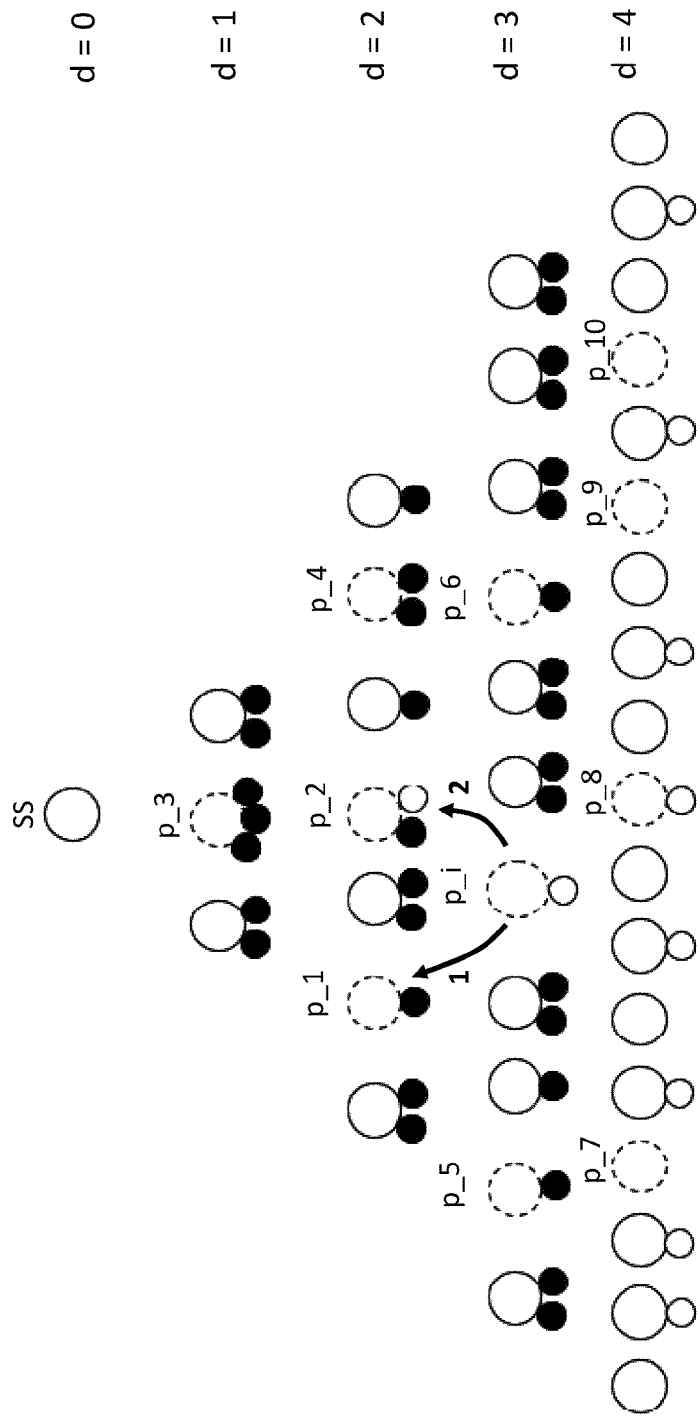
FIG. 5 illustrates an embodiment of the present invention involving multiple requests for requested data content.

FIG. 5 illustrates an embodiment of the present invention showing multiple requests in case requested data content cannot be downloaded from a selected one of the k peers on the list provided to the entering peer $p_i$ by he tracker T. Thus, in a basic and straightforward selection policy, an entering peer is given a list of k neighbouring peers from the tracker, and requests are made randomly to the neighbouring peers either until the requested data content is successfully downloaded or until a maximum number of allowed download requests have been reached, or alternatively until all neighbouring peers in the α region have been depleted (in case this is fewer than the maximum number of allowed requests). in which case the entering peer falls back on the streaming server for the requested content, which will decrease network savings. FIG. 5 shows arranging of peers in levels d=0 to d=4 starting from the streaming server SS at d=0. The dotted circles represent listed peers provided by the tracker and the smaller circles represent upload capacity u, where small black circles indicate currently occupied upload channels while small white circles indicate available upload channels.

As can be seen, a first download request is randomly made to neighbouring peer $p_1$ which has no available upload capacity, wherein the entering peer $p_i$ is allowed to make a further download request to neighbouring peer $p_2$ having free upload capacity. The entering peer $p_i$ can hence download the request content from the neighbouring peer $p_2$. This will advantageously increase the streaming server savings in the P2P network. Further, in addition to providing a P2P network offering greater savings, the present invention has the advantage that the expected savings and/or streaming source load can be estimated a priori, which has the resulting advantage that expected streaming source capacity can be calculated in advance.

Figure 6:
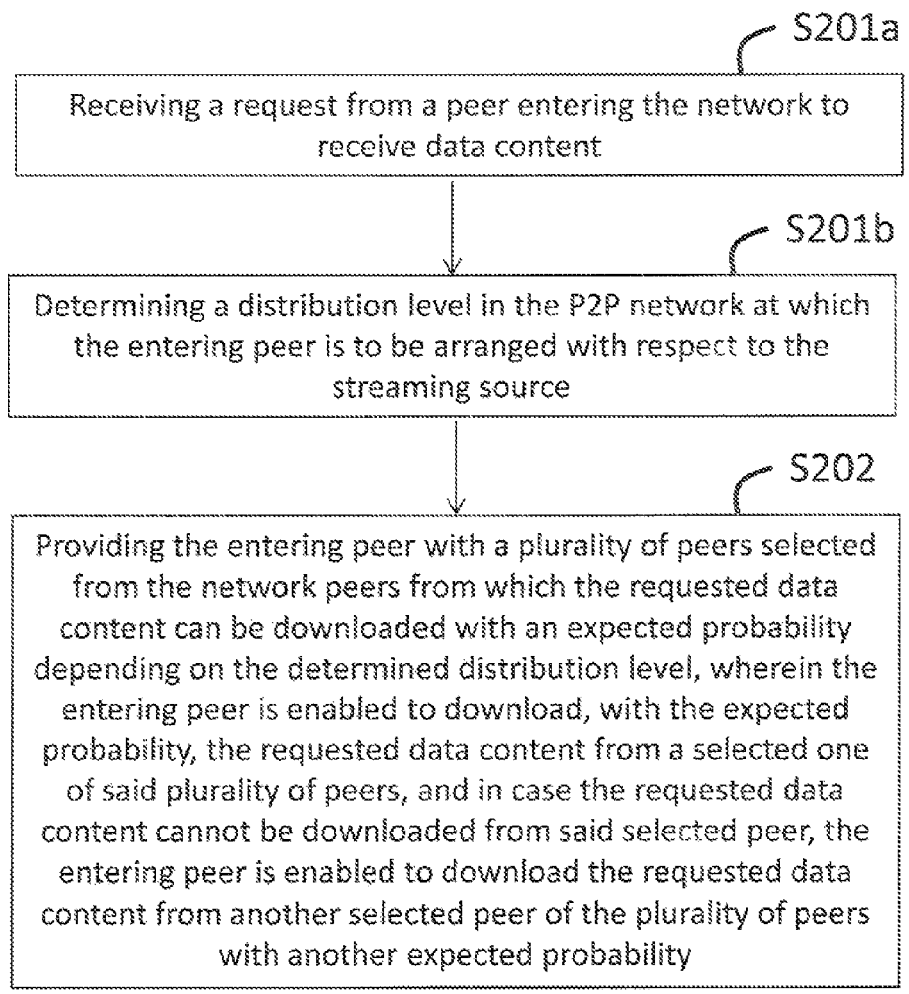
FIG. 6 shows a flowchart illustrating the method according to the first aspect of the present invention.

FIG. 6 shows a flowchart illustrating the method of arranging peers in a P2P network comprising a streaming source and network peers arranged at distribution levels in the P2P network according to the first aspect of the present invention. In a first step S201a, a tracker receives a request from a peer entering the network to receive data content. Thereafter, in step S201b, the tracker determines a distribution level in the P2P network at which the entering peer is to be arranged with respect to the streaming source. Further, in step S202, the tracker provides the entering peer with a plurality of peers selected from the network peers from which the requested data content can be downloaded with an expected probability depending on the determined distribution level, wherein the entering peer is enabled to download, with the expected probability, the requested data content from a selected one of the plurality of peers, and wherein in case the requested data content cannot be downloaded from the selected peer, the entering peer is enabled to download the requested data content from another selected peer of the plurality of peers with another expected probability.

Figure 7:
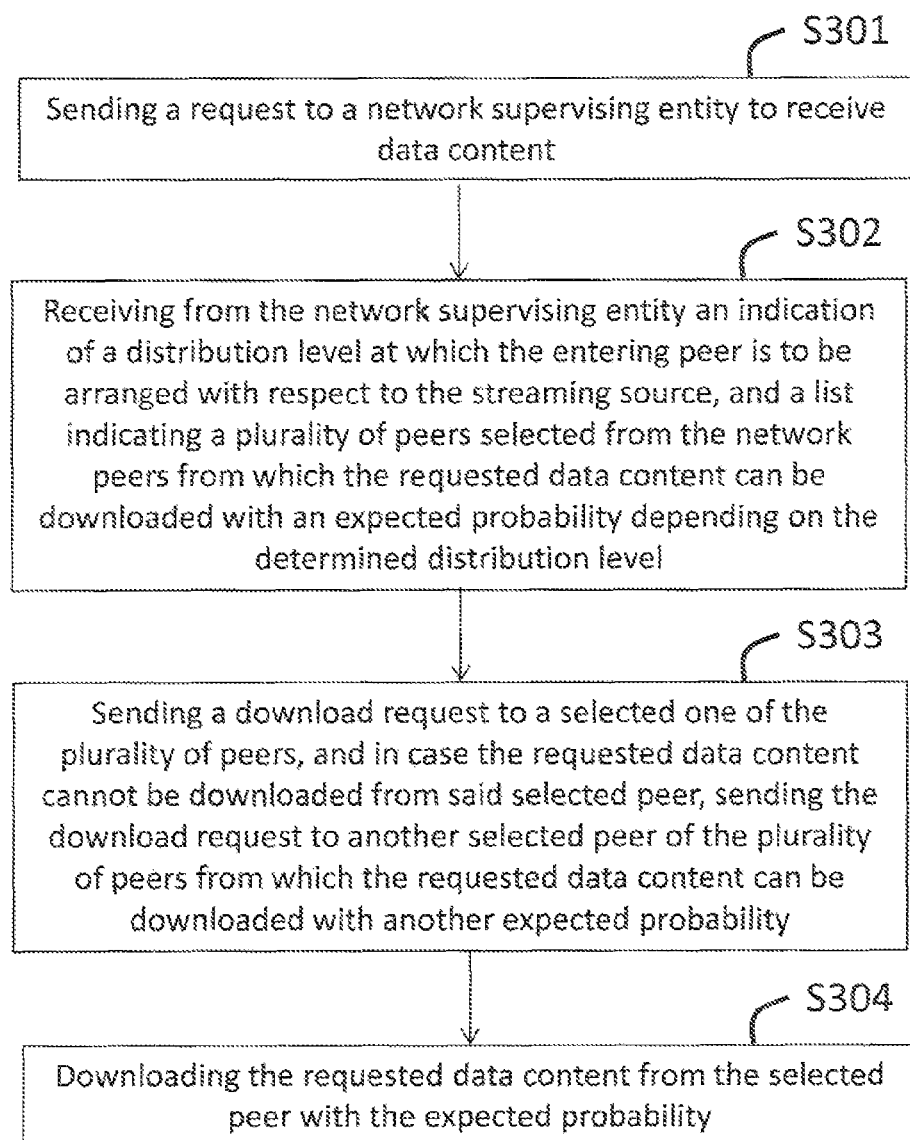
FIG. 7 shows a flowchart illustrating the method according to the third aspect of the present invention.

FIG. 7 shows a flowchart illustrating the method of arranging peers in a P2P network comprising a streaming source and network peers arranged at distribution levels in the P2P network according to the third aspect of the present invention. In a first step S301, an entering peer (in practice a peer device such as a television sets, mobile phone, a laptop, etc.) sends a request to a network supervising entity, i.e. the tracker, to receive data content. Thereafter, in step S302, the entering peer receives from the tracker an indication of a distribution level at which the entering peer is to be arranged with respect to the streaming source, and a list indicating a plurality of peers selected from the network peers from which the requested data content can be downloaded with an expected probability depending on the determined distribution level. Further, in step S303, the entering peer sends a download request to a selected one of the plurality of peers. Finally in step S304, the entering peer downloads the requested data content from the selected peer with the expected probability, wherein in case the requested data content cannot be downloaded from the selected peer, the entering peer is enabled to download the requested data content from another selected peer of the plurality of peers with another expected probability.

Now, as was discussed in the embodiment described with reference to FIG. 5, the download requests may be sent randomly to the neighbouring peers provided on the list submitted by the tracker. Hence, a random selection policy can be applied. However, as will be shown in the following, more elaborate selection policies are envisaged.

In the previous examples, the tracker did not take into account a situation where a joint probability of distribution level and upload capacity p(u, d) exists. If the distribution level and upload capacity is modelled as joint probability variables, it is possible to attain even better results in determining distribution level of an entering peer. The probability distribution of distribution level $d_i$ with respect to the streaming source is the sum over u of the joint probability $p(u, d_i)$ as follows:

$$p(d_i) = \sum_u p(u, d_i)$$

Thus, with respect to the embodiment shown with reference to FIG. 5, the joint probability is in a further embodiment considered when determining on which distribution level the entering peer is to be arranged.

In a further embodiment of the present invention, load allocation among peers in the network could be better balanced by having the tracker not only take into account the level and upload capacity u of the peers, i.e. not only the joint probability $p(u, d_j)$ of the level and upload capacity is considered, but also by giving priority to peers having a higher upload capacity. Thus, of the k neighbouring peers on the list provided by the tracker, the entering peer will send a request to the neighbouring peer having the highest upload capacity u. If two or more neighbouring peers have the same upload capacity, any one of the two or more peers could be selected for receiving the request. If the entering peer at level $d_j$ had one or more neighbouring peers in region $α_j$ and furthermore was indifferent with respect to the subset of neighbouring peers located in said region, i.e. in case a random and unbiased selection would be made for the request sent from the entering peer, the probability that its download request actually will go to a peer at level $d_j$ and upload capacity u is $p(u, d_j)/Pα_j$. However, in this further embodiment, the joint probability $p(u, d_j)$ of the level and upload capacity is weighted with upload capacity, resulting in $u{\times}p(u, d_j)$ wherein the probability that a request for content data is made to a peer having a higher upload capacity will increase.

Figure 8:
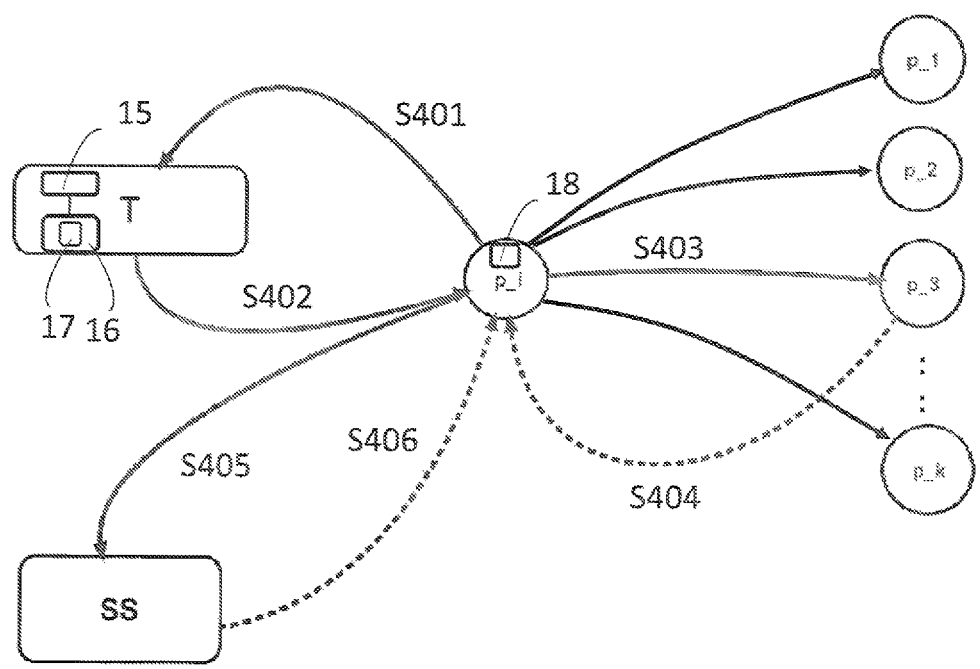
FIG. 8 illustrates an embodiment of the present invention where an entering peer requests data from a plurality of selected peers among a plurality of neighbouring peers according to an embodiment of the present invention.

FIG. 8 shows a P2P network in which embodiments of the present invention are implemented. Continuous lines denote request/reply messages, while dashed lines denote streaming channels. A new peer $p_i$ enters the network and requests the tracker T in step S401 via its communication interface to receive data content originally streamed from the streaming source SS. The tracker determines the level at which the entering peer $p_i$ is to be arranged. By controlling the level, the expected probability of a successful download can be varied accordingly; the more downstream the level, the higher the chance of successful download. However, this will on the other hand imply further delay from the real-time playback point RT.

This is for example performed by having the tracker T sample a conditional probability distribution of level and upload capacity p(d|u) for the network peers. Hence, the tracker T gives each joining peer its position in the network in terms of distribution level d from the streaming source SS based on its upload capacity u according to the conditional distribution p(d|u)=p(u, d)/p(u), i.e. the probability that an entering peer will be arranged at a level d given that it has an upload capacity of u. This is further advantageous in that peers having higher upload capacity can be arranged at a lower level, i.e. be placed closer to the streaming source SS. Thus, the joint distribution p(u, d) is the desired distribution that the P2P network will eventually settle to. To enable this, in an embodiment, each entering peer provides its upload capacity to the tracker with the request as submitted in step S401.

In step S402, the tracker T provides the entering peer $p_i$ with a list of a plurality k of peers from which the data content can be downloaded. Further, the list indicates upload capacity u of each among the k peers in order to have the entering peer subsequently give priority to a first peer having higher upload capacity u than a second peer among the plurality of randomly selected peers, when the entering peer $p_i$ is to determine a peer on the list from which to download the requested data content.

The upload capacity could be indicated either as an actual upload measure, but could alternatively be indicated by a prioritization number, where for instance 10 is the highest priority and 1 is the lowest priority. Each peer may thus be reporting to the tracker T its respective upload capacity when the peer enters the network.

Further, as to the tracker T selecting a plurality k of peers, this can be undertaken in a number of different ways. In a first alternative, the plurality of peers is randomly selected from the larger group of network peers, thus making it easy for the tracker T to make the selection. In a second alternative, the tracker T first selects a group of peers and then filters out a plurality k of peers at a level lower than that of the entering peer $p_i$. To the contrary, this filtering could alternatively be undertaken by the entering peer $p_i$ itself once the list of k randomly selected peer is received. In a third alternative, the tracker T provides the entering peer with a list which is more biased towards peers who have joined the network recently while incorporating their upload capacity, which peers are more likely to have available upload bandwidth since recently joining peers are less likely to yet have been fully loaded. Even further alternatives can be envisaged, such as e.g. whether peers are network address translation (NAT) compatible or not. In the following, it will be assumed that k peers are randomly selected by the tracker T.

The list provided by the tracker T to the entering peer $p_i$ in step S402 could have the appearance set out in Table 1.

TABLE 1

| Peer no. | Upload capacity (u) | Level (d) |
|---|---|---|
| $p_i$ | 1 | 3 |
| $p_1$ | 1 | 2 |
| $p_2$ | 2 | 2 |
| $p_3$ | 3 | 1 |
| $p_4$ | 2 | 2 |
| $p_5$ | 1 | 3 |
| $p_6$ | 1 | 3 |
| $p_7$ | 0 | 4 |
| $p_8$ | 1 | 4 |
| $p_9$ | 0 | 4 |
| $p_{10}$ | 0 | 4 |

Figure 9:
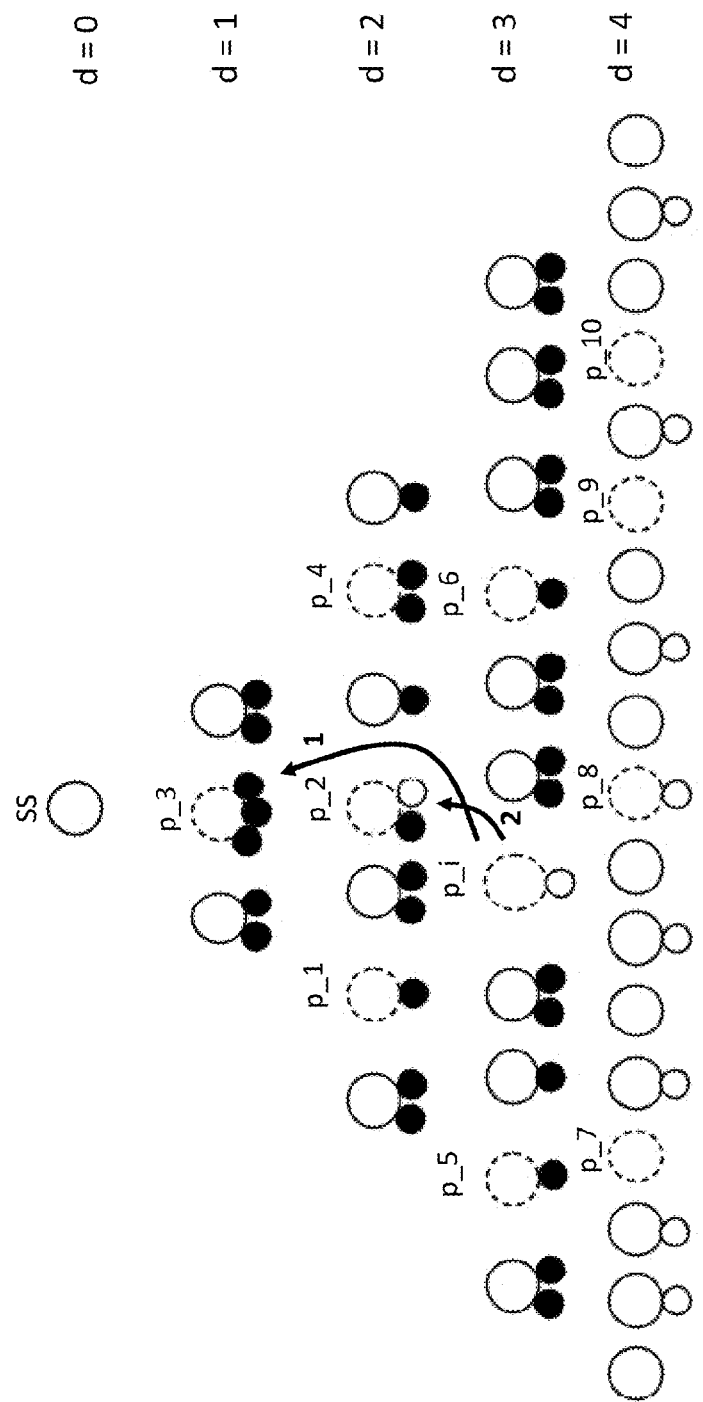
FIG. 9 illustrates a data request selection policy according to an embodiment of the present invention.

Reference is further made to FIG. 9 showing arranging of peers in levels according to Table 1 starting from the streaming server SS at d=0. Again, the dotted circles represent listed peers provided by the tracker and the smaller circles represent upload capacity u, where small black circles indicate currently occupied upload channels while small white circles indicate available upload channels.

With reference to FIG. 8, the entering peer requests in step S403 a selected peer on the list, i.e. a selected one of peers $p_1, p_2, p_3, \ldots, p_k$, to supply it with the latest subset of data given the determined level $d_i$ for the entering peer $p_i$. If there exists at least one peer out the k selected peers at a level with respect to the streaming source that is lower than that determined for the entering peer, it is possible that the requested data content can be uploaded to the entering peer $p_i$. As can be seen in Table 1 and corresponding FIG. 9, peer $p_3$ is selected by the entering peer $p_i$ since it has the highest upload capacity of the peers selected by the tracker T and is thus given priority among the plurality of peers selected by the tracker T. In this particular exemplifying embodiment, the peer $p_3$ further is at a level lower than that of the entering peer $p_i$. However, a request from the entering peer $p_i$ to the neighbouring peer $p_3$ to download a desired piece of content will still not be successful since the peer $p_3$ has no free capacity. The entering peer $p_i$ consequently submits a further download request to another listed peer. In this particular exemplifying embodiment, two of the remaining neighbouring peers $p_2$ and $p_4$ have the highest upload capacity (and are placed on a level lower than that of entering peer $p_i$) As can be seen in FIG. 9, the second download request is made to the neighbouring peer $p_2$ which as free capacity. The neighbouring peer $p_2$ subsequently uploads, in step S404, the requested data content to the entering peer $p_i$. If no peer exists, among the listed peers, at a level with respect to the streaming source that is lower than that determined for the entering peer, or if no upload capacity can be provided, or if a maximum number of request attempts has been reached, the requested data content cannot be uploaded in step S404 to the entering peer. In that case, the entering peer $p_i$ will in step S405 turn to the streaming server SS for the requested data content, which in its turn will upload the requested data content to the entering peer in step S406.

Reference is made to Table 2 showing another exemplifying list of peers provided by the tracker T to the entering peer $p_i$ in step S402.

TABLE 2

| Peer no. | Upload capacity (u) | Level (d) |
|---|---|---|
| $p_i$ | 1 | 3 |
| $p_1$ | 1 | 2 |
| $p_2$ | 2 | 2 |

TABLE 2-continued

| Peer no. | Upload capacity (u) | Level (d) |
|---|---|---|
| $p_3$ | 2 | 1 |
| $p_4$ | 2 | 2 |
| $p_5$ | 3 | 3 |
| $p_6$ | 1 | 3 |
| $p_7$ | 0 | 4 |
| $p_8$ | 1 | 4 |
| $p_9$ | 0 | 4 |
| $p_{10}$ | 0 | 4 |

Figure 10:
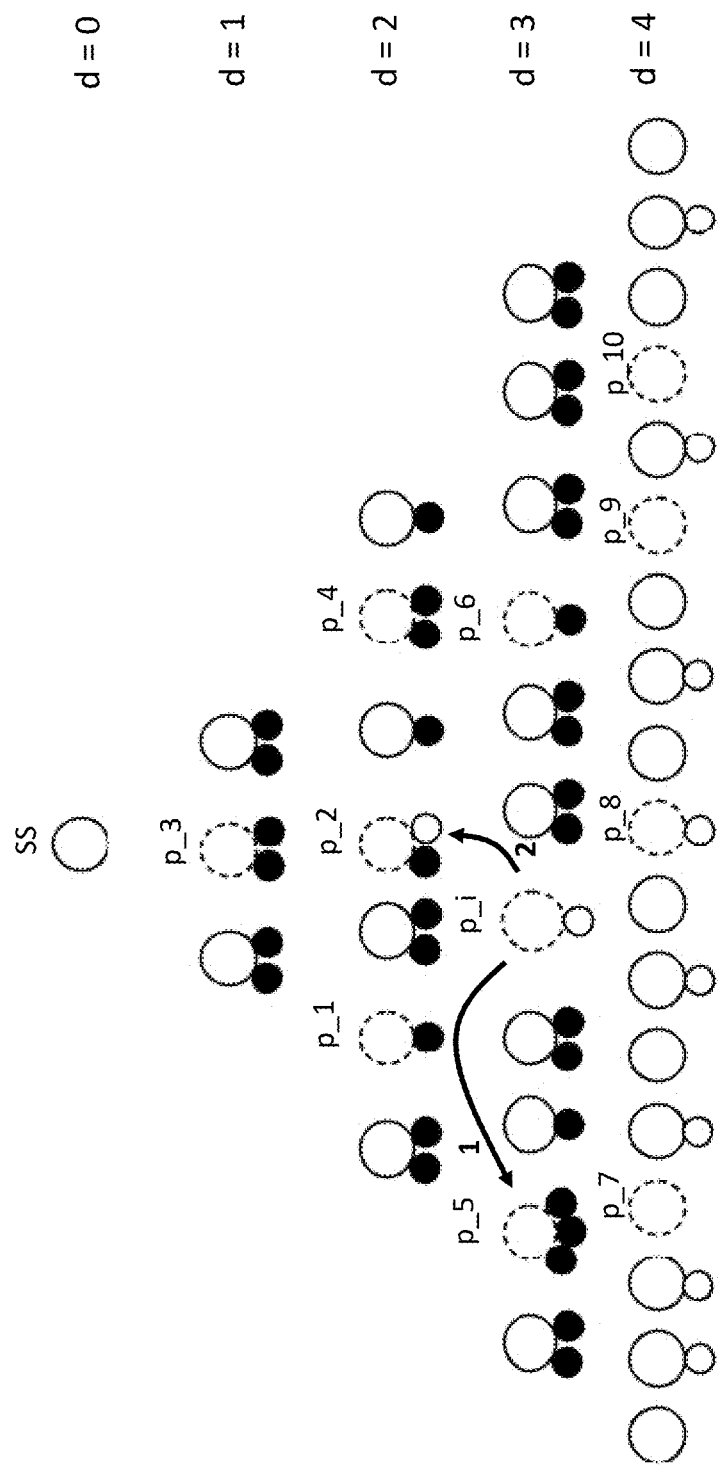
FIG. 10 illustrates a data request selection policy according to a further embodiment of the present invention.

Reference is further made to FIG. 10 showing arranging of peers in levels according to Table 2 starting from the streaming server SS at d=0. The only difference from the setup shown in Table 1 is that peer $p_3$ has an upload capacity of 2 and peer $p_5$ has an upload capacity of 3.

In this particular, example peer $p_3$ no longer has the highest upload capacity of the peers selected by the tracker T. Instead, peer $p_5$ is the selected peer having the highest upload capacity (i.e. u=3) and is thus given priority among the plurality of peers selected by the tracker T. However, in this particular exemplifying embodiment, peer $p_5$ is arranged at a level equal to that of the entering peer $p_i$. A request from the entering peer $p_i$ to the neighbouring peer $p_3$ to download a desired piece of content will thus not be successful since the neighbouring peer $p_3$ does not have access to the content data requested by the entering peer. A second request submitted to the neighbouring peer $p_2$ having second highest upload capacity and a free upload channel, is however successful.

To avoid this scenario, another embodiment of the present invention will be described where the tracker T will undertake a more elaborate selection process when creating the list of k selected peers to be provided to the entering peer $p_i$. Reference is made to Table 3 showing a further exemplifying list of peers provided by the tracker T to the entering peer $p_i$ in step S402 of FIG. 8.

TABLE 3

| Peer no. | Upload capacity (u) | Level (d) |
|---|---|---|
| $p_i$ | 1 | 3 |
| $p_1$ | 1 | 2 |
| $p_2$ | 2 | 2 |
| $p_3$ | 2 | 1 |
| $p_4$ | 2 | 2 |

Figure 11:
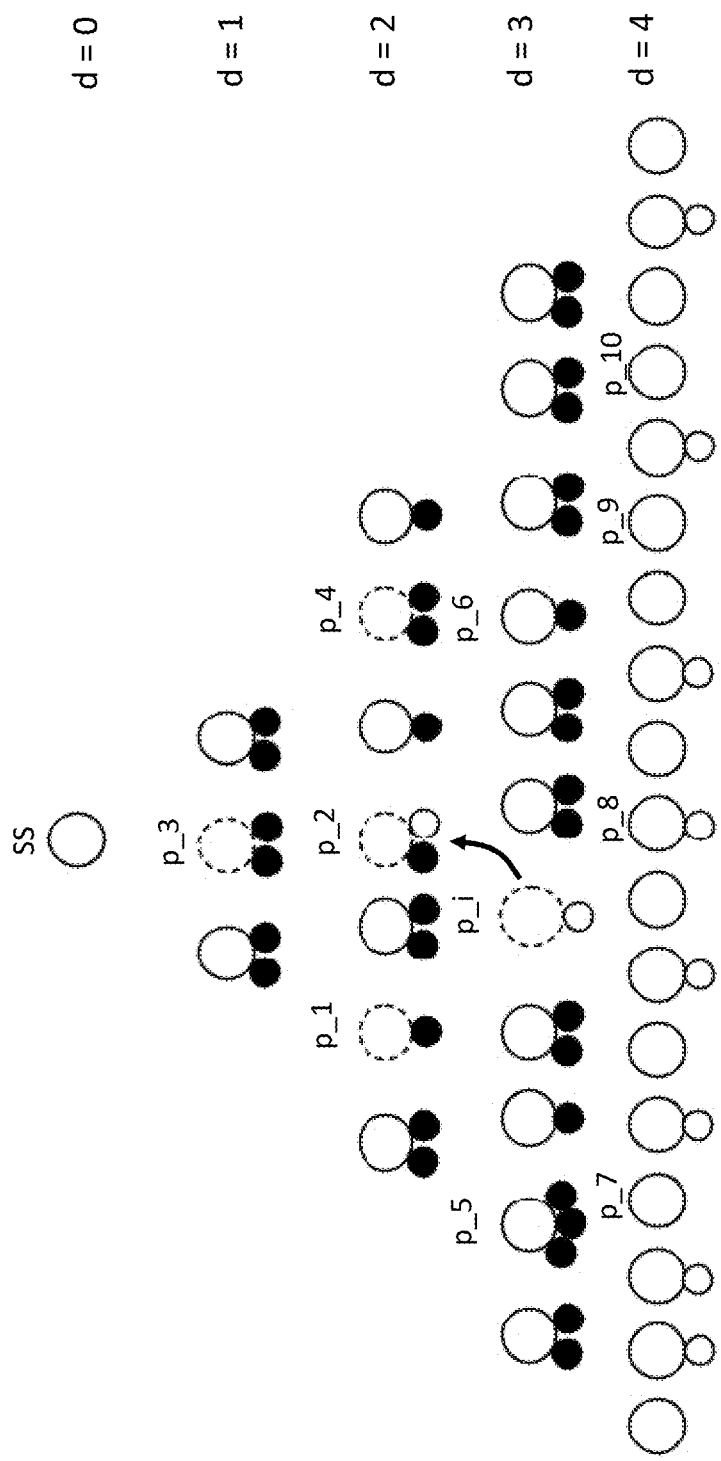
FIG. 11 illustrates a data request selection policy according to still a further embodiment of the present invention.

As can be seen in Table 3 and FIG. 11, the tracker T, or alternatively the entering peer $p_i$ itself, has filtered out all peers at a level equal to or greater than that of the entering peer $p_i$, which raises the requirements on the tracker T (or the entering peer), but will increase the probability that the entering peer $p_i$ successfully will download requested data from one of its neighbouring peers. In this particular embodiment, the entering peer has either neighbouring peer $p_2$, $p_3$ or $p_4$ available for request of data in step S403, since $p_1$ will not be considered due to lower upload capacity. Thus the request can go to any one of these three peers in step S403. In the exemplifying embodiment of FIG. 8, it is assumed that the request goes to peer $p_2$ as indicated by the arrow. Since peer $p_2$ has free upload capacity, the entering peer will download the requested content in step S404 from the selected peer $p_2$ 403. It should be noted that in case the Tracker T filters out all peers at a level equal to or greater than that of the entering peer $p_i$, it could add further peers to the list such that it contains the same number of peers as before the filtering.

In analogy with that discussed above, depending on how the level $d_j$ for the entering peer $p_i$ is selected, the probability that the streaming server SS will have to upload the requested data content to the entering peer in step S406 can be increased or decreased. These probabilities will be discussed in detail in the following. The savings in the streaming server SS bandwidth is directly related to the probability that a network peer can upload requested data content to the entering peer $p_i$.

If the selection policy regarding peers having a highest upload capacity according to embodiments of the present invention is applied, it can be assumed that each peer is more likely to request data content from a neighbouring peer with a higher bandwidth/upload capacity u, the selection policy still requiring that the neighbouring peer is arranged at a level lower than that of the requesting peer. For a level $d_i$ the number of expected download requests from peers at level $d_i$ would then be:

$$R_{iju} = \begin{cases} N_{pi} \, Y^b_{iju} & \text{if } j \leq i - \delta \\ 0 & \text{otherwise} \end{cases},$$

where $$Y^b_{iju} = \frac{p(d_j)}{p_{\alpha_i}} \frac{up(u, d_j)}{\sum_u up(u, d_j)}$$

The selection policy employed in this embodiment will guarantee that no request for data content is made to a neighbouring peer having u=0 (being for instance a mobile phone). It can be seen that this selection policy takes into account the bandwidth that is available at a given level $d_j$ for a peer having a certain potential bandwidth u, i.e. by advantageously forming the term u p(u, $d_j$). Thus, in addition to allocating load on peers based on the joint probability of level and upload capacity, p(u, $d_j$), this embodiment enhances the selection policy by requesting data content with higher probability from peers having higher upload capacity, which will facilitate load balancing as peers with higher upload capacity will receive more requests than peers with low upload capacity and hence this will increase the savings, since the probability of having peers falling back on the streaming server for requested data content decreases.

Figure 12:
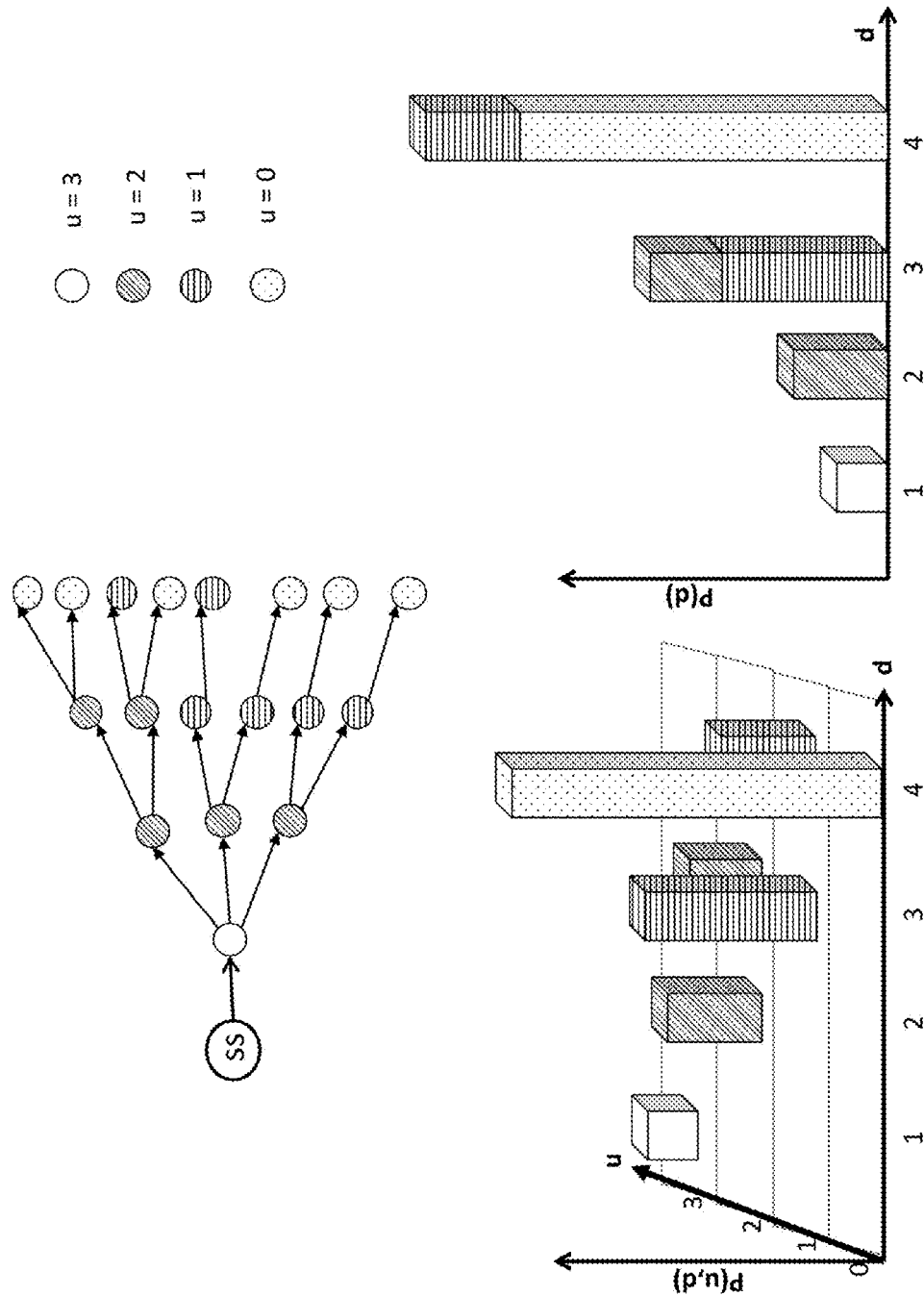
FIG. 12 illustrates joint probability of distribution level and upload capacity.

FIG. 12 illustrates joint probability of distribution level and upload capacity p(u, d). The upper left part of FIG. 12 shows a P2P network where peers are arranged at a first, second, third and fourth level with respect to a streaming source. Further, the peers in the network have an upload capacity from u=0 to u=3. The lower left part of FIG. 12 illustrates the joint probability p(u, d) on the z axis, while the y axis represents the upload capacity and the x axis represents the distribution level of the peers in the P2P network. The lower right part of FIG. 12 shows a discrete version of a p(d) distribution (previously illustrated in FIG. 4) derived from the p(u, d) distribution shown in the lower left part. That is, the p(d) distribution is formed by aggregating probability masses at each distribution level. Analogously, a p(u) distribution could be formed by aggregating the probability masses at each upload capacity measure.

The total number of download requests that neighbouring peers make to peers at level $d_j$ and upload capacity u is:

$$R_{ju} = \sum_{i=j+1}^{\infty} R_{iju}$$

In order to find how many of these requests will be satisfied given that the number of peers at level $d_j$ and upload capacity u is expressed as $N_{ju}$, the probability that a peer at level $d_j$ and upload capacity u will respond to l requests for download from the total number $R_{ju}$ of download requests as:

$$B_{ju}(l) = \binom{R_{ju}}{l}\left(\frac{1}{N_{ju}}\right)^l \left(1 - \frac{1}{N_{ju}}\right)^{R_{ju}-l}$$

where $N_{ju}=p(u, j)N$ is the expected number of peers at level $d_j$ and upload capacity u. Therefore, the expected number of successful responses that peers at level $d_j$ and upload capacity u make to download requests from neighbouring peers (i.e. the load on peers at level $d_j$ and upload capacity u) is:

$$L_{ju} = \left(\sum_{l=1}^{u} l B_{ju}(l) + u\left(1 - \sum_{l=0}^{u} B_{ju}(l)\right)\right) N_{ju}$$

and hence the expected number of peers streaming from the P2P network is the total number of successful downloads:

$$L = \sum_{j=0}^{\infty} \sum_{u} L_{ju}$$

and the savings will be expressed as in Equations (8) or (7).

With reference to Equation (6), $P_s(d_i)$ can be calculated, i.e. the probability that a peer with at a level $d_i$ makes a successful download from the P2P network when peer upload capacity represented by u $p(u, d_j)$ is taken into account, where u' is for summation in the numerator and represents a summation over all possible values of upload capacity.

$$P_S = (d_i) = (1 - P_F(d_i)) \sum_{u} \sum_{j=0}^{j=i-1} \frac{L_{ju}}{R_{ju}} \frac{p(d_j)}{p_{\alpha i}} \frac{up(u, d_j)}{\sum_{u'} u' p(u', d_j)} \quad (9)$$

Thus, again with reference to FIG. 5, in this embodiment of the present invention, the probability of having a selected peer out of the k listed randomly selected peers successfully upload requested data content in step S404 to the entering $p_i$ is given by $P_s(d_i)$ expressed by Equation (9).

As can be seen, in addition to previously discussed advantages of the present invention, the expected savings and/or streaming source load can be estimated a priori, which has the resulting advantage that expected streaming source capacity can be calculated in advance.

In yet a further embodiment, should two or more neighbouring peers have the same upload capacity u, but different latencies d (lower than that of the entering peer p), the entering peer will send the request to the one of the two or more neighbouring peers being nearest positioned in the P2P network, i.e. the one of the two or more peers at a level closest to that of the entering peer $p_i$. With reference to the example shown in FIG. 11 and Table 3, the neighbouring peers $p_2$, $p_3$, and $p_4$ have the same upload capacity (u=2), implying that the entering peer $p_i$ could send a download request to peer $p_3$ located at the first level.

However, in P2P networks, there is a risk that peers at a level close to the streaming source will be assigned a greater load than those peers which are located further downstream, even if the distribution over distribution levels is assumed to be uniform. That is because peers at a level $d_i$ potentially will be a target for content requests from all peers at levels $d_i+\delta$, $d_i+2\delta$, $d_i+3\delta$, and so on. Hence, if streaming server savings are to be improved, there is a trade-off between increasing density among peers being located at a level closes to the streaming source to handle the load from peers being located at levels further away from the source, and increasing the probability that peers will download directly from the streaming server since the density of peers closes to the streaming server is increased. Therefore, it may be desirable to construct the P2P network such that a selection policy is applied where peers will prioritize their nearest upstream neighbouring peers, in which case a significant load balancing among the peers in the network can be achieved. Thus, in this particular embodiment, the entering peer $p_i$ will send a download request to any one of the neighbouring peers $p_2$ or $p_4$ rather than to the neighbouring peer $p_3$; if a multiplicity of peers have the same bandwidth, the nearest peer is selected for receiving a download request. The probability distribution of bandwidth in the α region is calculated as:

$$p_{\alpha_i}(u) = \sum_{j \in \alpha_i} p(u, j)$$

Given that a peer falls in the α region, the probability that it will have a bandwidth u will hence be:

$$p_i(u) = \frac{p_{\alpha_i}(u)}{p_{\alpha_i}}$$

The probability that c peers in the α region having the same bandwidth u are selected for receiving a download request in this particular embodiment can be calculated as:

$$\bar{\rho}_{iju}^c = \left(1 - \left(1 - \frac{p(u, d_j)}{p_{\alpha_{j+1}}(u)}\right)^c\right) \prod_{w=j+\delta}^{i-\delta} \left(1 - \frac{p(u, d_w)}{p_{\alpha_{w+1}}(u)}\right)^c$$

It follows that the probability of selecting a peer by giving preference to those with greater upload capacity and selecting the one that is nearest in the case of having a number of peers with the same upload capacity is:

$$\check{p}_{iju} = \sum_{c=1}^{k} \binom{k}{c} (p_{\alpha_i}(u))^c (1 - p_{\alpha_i}(u))^{k-c} \bar{\rho}_{iju}^c$$

For a level $d_j$, the number of expected download requests from peers at level $d_i$ given this slight modification would be:

$$R_{iju} = \begin{cases} N_i \check{\rho}_{iju} & \text{if } j \leq i - \delta \\ 0 & \text{otherwise} \end{cases}$$

Thus, with this embodiment, it is possible to avoid putting a higher load on peers positioned at a level close to the streaming source than those peers which are located further downstream. The probability of successful download, $P_s(d_i)$, can be calculated accordingly in line with Equation (9).

As has been previously described, there is a risk in P2P networks that peers being arranged at a low distribution level with respect to the streaming source, i.e. peers being located close to the streaming source, will be assigned a greater load than those peers which are further away from the streaming source, i.e. peers arranged at a higher level, even if the distribution over levels is assumed to be uniform. That is because peers at level $d_i$ potentially will be a target for content requests from all peers at levels $d_i+\delta$, $d_i+2\delta$, $d_i+3\delta$, and so on. Hence, if streaming server savings are to be improved, there is a trade-off between increasing density among peers having low latency with respect to the real-time playback point, i.e. peers arranged at a level closer to the source, to handle the load from peers having higher latency, and increasing the probability that peers will download directly from the streaming server since the density of peers closes to the streaming server is increased. Therefore, it may be desirable to construct the P2P network such that a selection policy is applied where peers will prioritize their nearest neighbouring peers, in which case a significant load balancing among the peers in the network can be achieved. Hence, in an embodiment of the present invention, an entering peer is instructed to prioritize its nearest neighbouring peer(s) at a level which is lower than the level determined for the entering peer.

Figure 13:
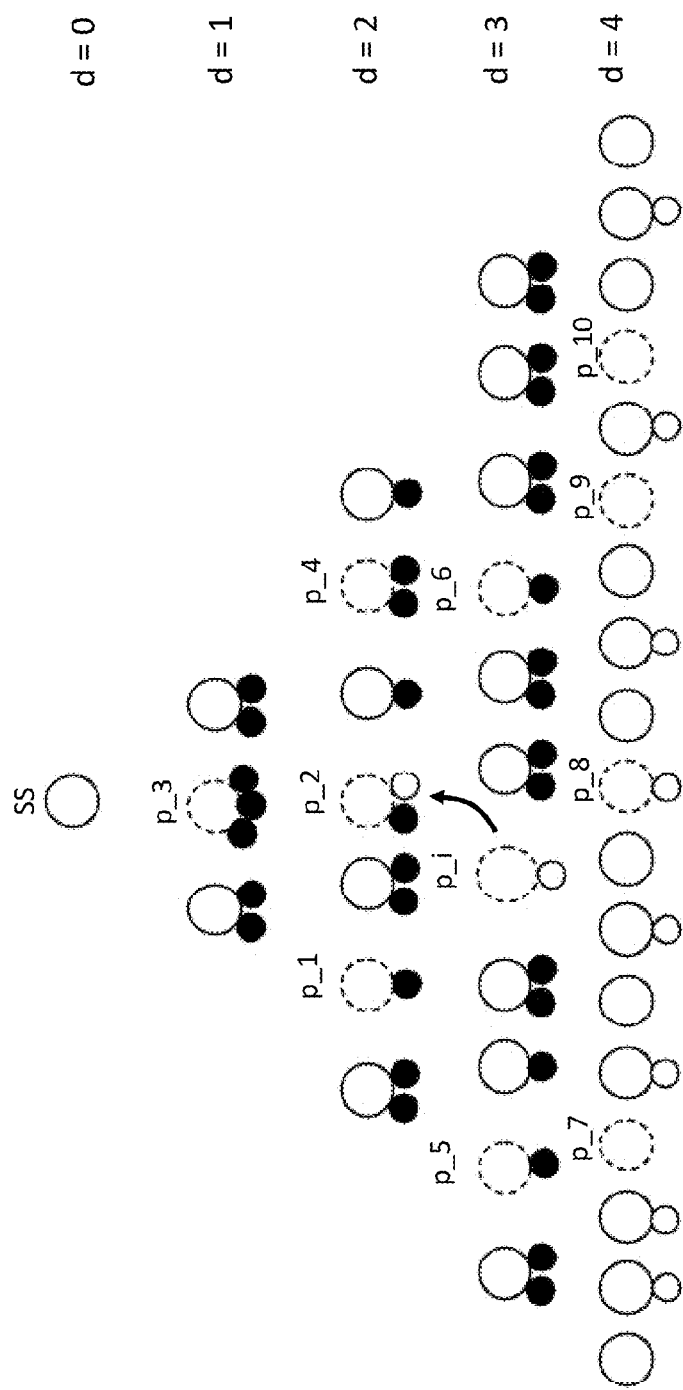
FIG. 13 illustrates a data request selection policy according to yet a further embodiment of the present invention.

Reference is made to FIG. 13 (and earlier FIG. 8), where it can be seen that the list provided by the tracker T to the entering peer $p_i$ in step S402 has the appearance as that previously set out in Table 1.

In this particular embodiment, a nearest peer selection policy is applied; when sending the download request, the peers are not given priority in order of upload capacity, but in order to closeness in the distribution levels. However, a further embodiment combining a nearest peer selection policy and a highest bandwidth selection policy will be described subsequently.

Thus, again with reference to FIG. 8, the entering peer requests in step S403 a selected peer on the list, i.e. a selected one of peers $p_1, p_2, p_3, \ldots, p_k$, to supply it with the latest subset of data given the determined level $d_i$ at which the entering peer $p_i$ is arranged. As can be seen in FIG. 13, peer $p_2$ is selected by the entering peer $p_i$ since it is located at the nearest level of the peers selected by the tracker T and is thus given priority among the plurality of peers (along with peers $p_1$ and $p_4$). A request from the entering peer $p_i$ to the neighbouring peer $p_2$ to download a desired piece of content is thus successful (given that the peer $p_2$ has available upload capacity, which in this case it has). The neighbouring peer $p_2$ subsequently uploads, in step S404, the requested data content to the entering peer $p_i$. If no peer exists among the listed peers which is arranged at a level with respect to the streaming source that is lower than that determined for the entering peer, the requested data content cannot be uploaded in step S404 to the entering peer. In that case, the entering peer $p_i$ will in step S405 turn to the streaming server SS for the requested data content, which in its turn will upload the requested data content to the entering peer in step S406. The entering peer $p_i$ also have to turn to the streaming server SS in case none of the neighbouring peers out of the k selected peers located in region $\alpha$ can upload due to limitations in bandwidth capacity. In FIG. 13, the entering peer $p_i$ could have submitted a download request to either one of neighbouring peers $p_1$ or $p_4$, also being arranged at the level nearest to the entering peer, but would in that case have had to submit further requests until a request reached neighbouring peer $p_2$ being the only neighbouring peer with free upload capacity.

Hence, the entering peer request data from its nearest peer on the list. This scenario is modeled by applying a download selection policy where a peer with latency $d_i$ requests data from a peer having latency $d_j$. Thus, a different probability distribution for peer requests is assumed with respect to the previously described download selection policy where an entering peer randomly selects a neighbouring peer from the list provided by tracker, or selects a neighbouring peer from the list based on upload capacity.

When applying the nearest-peer-selection policy according to embodiments of the present invention, it is first assumed that for any peer at level $d_i$, the number of neighbours in region $\alpha_i$ out of the k neighbours is c. The probability that no peer out of the c neighbours will be arranged at level i-$\delta$ is:

$$p_f^c(d_{i-\delta}) = \left(1 - \frac{p(d_{i-\delta})}{p_{\alpha_i}}\right)^c.$$

Furthermore, the probability that no peer out of the c neighbouring peers will be arranged at level i-2$\delta$ (given that there were no neighbouring peers at level i-$\delta$) is:

$$p_f^c(d_{i-2\delta}) = \left(1 - \frac{p(d_{i-2\delta})}{p_{\alpha_{i-\delta}}}\right)^c.$$

In general $p_f^c(d_{i-\omega\delta})$ is the probability of having none of c neighbouring peers in region $\alpha_i$ at level i-$\omega\delta$ (given that none of the neighbouring peers were located at level i-$\delta$, i-2$\delta$, . . . , i-$\omega\delta$).

Further, the probability of having no neighbouring peer in the interval [j+$\delta$, i-$\delta$] is:

$$p_{f_{i,j}}^c = \prod_{w=j+\delta}^{i-\delta} p_f^c(d_w),$$

where $j \leq i-\delta$ and $(1-p_f^c(j))$ is the probability that at least one of the c neighbouring peers is arranged at level j and all c neighbours also fall in region $\alpha_{j+1}$. As it has been assumed that all c neighbouring peers fall in region $\alpha_i$, the probability of having all c neighbouring peers fall in region $\alpha_{j+1}$ is simply $p_{f_{i,j}}^c$. Then, for peers having latency $d_i$, the probability of having at least one neighbouring peer arranged at level $d_j$, given that all c neighbouring peers fall in $\alpha_{j+1}$ is:

$$\rho_{ij}^c = \left(1 - \left(1 - \frac{p(d_j)}{p_{\alpha_{j+1}}}\right)^c\right) \prod_{w=j+\delta}^{i-\delta} \left(1 - \frac{p(d_w)}{p_{\alpha_{w+1}}}\right)^c$$

$$= (1 - p_f^c(d_j)) p_{f_{i,j}}^c$$

Next, this probability is calculated for all values of c, i.e. for c=1, . . . , k as follows:

$$\rho_{ij} = \sum_{c=1}^{k} \binom{k}{c}(p_{\alpha_i})^c(1-p_{\alpha_i})^{k-c}\rho_{ij}^c,$$

which in this particular embodiment is the distribution of the $N_{pi}$ requests in region $\alpha_i$.

As previously has been discussed, in a more elaborate selection policy, the tracker not only takes into account distribution level but also upload capacity u of the plurality of selected peers.

The number of download requests, $R_{iju}$, from peers with latency $d_i$ to peers with latency $d_j$ and upload capacity u, is:

$$R_{iju} = \begin{cases} N_i\rho_{iju} & \text{if } j \leq i-\delta \\ 0 & \text{otherwise} \end{cases}, \quad (10)$$

where $$\rho_{iju} = \rho_{ij}\frac{p(u,d_j)}{p(d_j)}$$

Now, with respect to the embodiment of the invention concluded in Equation (10), i.e. the selection policy where the nearest peer is selected for receiving a download request when considering the joint probability $p(u, d_i)$, $P_s(d_i)$ can be calculated, i.e. the probability that a peer at a level $d_i$ makes a successful download from the P2P network when selecting a nearest peer, with reference to Equation (6):

$$P_S(d_i) = (1-P_F(d_i))\sum_{u}\sum_{j=0}^{j=i-1}\frac{L_{ju}}{R_{ju}}\rho_{ij}\frac{p(u,d_j)}{p(d_j)} \quad (11)$$

Thus, again with reference to FIG. 8, in this embodiment of the present invention, the probability of having a selected peer out of the k listed peers successfully upload requested data content in step S404 to the entering $p_i$ is given by $P_s(d_i)$ expressed by Equation (11).

As can be seen, in addition to previously discussed advantages of the present invention, the expected savings and/or streaming source load can be estimated a priori, which has the resulting advantage that expected streaming source capacity can be calculated in advance.

As previously has been discussed, in an embodiment of the present invention, the tracker T of FIG. 8 samples a conditional probability distribution of level and upload capacity p(d|u) for the network peers. Hence, the tracker T gives each entering peer its position in the network in terms of distribution level d from the streaming source SS based on its upload capacity u according to the conditional distribution p(d|u)=p(u, d)/p(u), i.e. the probability that an entering peer will be arranged at a level d given that it has an upload capacity of u. This is further advantageous in that peers having higher upload capacity can be arranged at a lower level, i.e. be placed closer to the streaming source SS. Thus, the joint distribution p(u, d) is the desired distribution that the P2P network will eventually settle to. To enable this, in an embodiment, each entering peer provides its upload capacity to the tracker T with the request as submitted in step S401. As a consequence, in addition to taking into account nearest neighbouring peers, their respective upload capacity is also considered and further given priority when the entering peer $p_i$ determines to which listed peer a download request should be submitted. It is here assumed that the probability distribution of requests from peers having latency $d_i$ to neighbouring peers having latency $d_j$ and bandwidth u is proportional to the density of u×p(u, d), i.e. the density of the joint probability p(u, d) of the latency and bandwidth weighted with the bandwidth u. The following modification is undertaken accordingly:

$$R_{iju} = \begin{cases} N_i\hat{\rho}_{iju} & \text{if } j \leq i-\delta \\ 0 & \text{otherwise} \end{cases}, \quad (12)$$

where $$\hat{\rho}_{iju} = \rho_{ij}\frac{u\,p(u,d_j)}{\sum_u u\,p(u,d_j)}.$$

This selection policy tends to behave as if there is a central coordination, since the tracker will have a peer prefer to request data content from the nearest possible neighbouring peer, which is similar to the concept of centrally managed systems where each level utilize the required bandwidth from the preceding level. Also, this policy handles load balancing among peers in that a request is made to a given peer relative to its upload bandwidth u.

To illustrate a further embodiment of the present invention, where peers are further given priority by also considering their upload capacity, reference is made again to Table 1 and FIG. 13.

With reference to FIG. 8, a new peer $p_i$ enters the network and requests the tracker T in step S401 via its communication interface to receive data content originally streamed from the streaming source SS. The tracker determines the level at which the entering peer $p_i$ is to be arranged, for instance by sampling a conditional probability distribution of level and upload capacity p(d|u) for the network peers. Hence, the tracker T gives each entering peer its position in the network in terms of distribution level d from the streaming source SS based on its upload capacity u according to the conditional distribution p(d|u)=p(u, d)/p(u), i.e. the probability that an entering peer will be arranged at a level d given that it has an upload capacity of u.

In step S402, the tracker T hence provides the entering peer $p_i$ with a list of a plurality k of peers from which the data content can be downloaded. Further, the list indicates the level d at which each peer among the k peers is arranged in the P2P network in order to have the entering peer subsequently give priority to a first peer being arranged at a level closer to that of the entering peer than a second peer among the plurality of selected peers, when the entering peer $p_i$ is to select a peer on the list from which to download the requested data content.

In step S402, the tracker T provides the entering peer $p_i$ with a list of a plurality k of peers from which the data content can be downloaded. Further, in this particular embodiment, the list indicates bandwidth capacity u of each among the k peers in order to have the entering peer subsequently give priority to a first peer having higher bandwidth capacity u than a second peer, if the first and the second peer are arranged at the same (nearest) level among the plurality of selected peers, when the entering peer $p_i$ is to determine to which peer on the list a request for download of data content is to be submitted.

As can be seen in FIG. 13, neighbouring peers $p_2$ and $p_4$ are located at the second level, i.e. the level nearest the third level at which the entering peer $p_i$ is arranged. Thus, in a previously described embodiment, where the upload capacity of the neighbouring peers were not taken into account when the entering peer $p_i$ was to select a peer for submission of a download request, any one of the neighbouring peers $p_1$, $p_2$ and $p_4$ could have been subject to the download request. However, in this particular embodiment, neighbouring peer $p_1$ has u=1 while neighbouring peers $p_2$ and $p_4$ have u=2, meaning that the entering peer $p_i$ will select either peer $p_2$, or $p_4$ as recipient of the download request in step S403. As can be seen, the request is successfully made to peer $p_2$. The neighbouring peer $p_3$ subsequently uploads, in step S404, the requested data content to the entering peer $p_i$. However, had the request been made to peer $p_4$, it would have been unsuccessful, and a further, successful request would have been made to peer $p_4$. Hence, the entering peer request data from its nearest peer on the list but further prioritize upload capacity in case two or more peers are located at the nearest level.

In this context, the tracker T provides in yet another embodiment of the present invention the entering peer with a list which is more biased towards peers who have joined the network recently while incorporating the respective upload capacity, which peers are more likely to have available upload bandwidth since recently joining peers are less likely to yet have been fully loaded.

In analogy with that discussed above, depending on how the level $d_i$ for the entering peer $p_i$ is selected, the probability that the streaming server SS will have to upload the requested data content to the entering peer in step S406 can be increased or decreased. These probabilities have been discussed in detail hereinabove and will be discussed in further detail in the following. The savings in the streaming server SS bandwidth is directly related to the probability that a network peer can upload requested data content to the entering peer $p_i$.

If the selection policy according to embodiments of the present invention is applied, where priority further is given to peers having the highest upload capacity of two or more peers located at the nearest level, it can be assumed that each peer is more likely to request data content from a neighbouring peer with a higher bandwidth/upload capacity u. For a level $d_j$, the number of expected download requests from peers at level $d_i$ was calculated in Equation (12).

The selection policy employed in this embodiment will guarantee that no request for data content is made to a neighbouring peer having u=0 (being for instance a mobile phone). It can be seen that this selection policy takes into account the bandwidth that is available at a given level $d_i$ for a peer having a certain potential bandwidth u, i.e. by advantageously forming the term $u\, p(u, d_j)$. Thus, in addition to allocating load on peers based on the joint probability of level and upload capacity, $p(u, d_j)$, this embodiment enhance the selection policy by requesting data content with higher probability from peers having higher upload capacity, which will facilitate load balancing as peers with higher upload capacity will receive more requests than peers with low upload capacity and hence this will increase the savings, since the probability of having peers falling back on the streaming server for requested data content decreases.

Thus, for the embodiment of the invention using a selection policy where the nearest peer is selected for receiving a download request when considering the joint probability $p(u, d_j)$, and further prioritization of upload capacity is made, the expected probability of successful download, $P_s(d_i)$, can be calculated in line with what previously has been discussed using that concluded in Equation (12).

As previously has been discussed, the concept of multiple requests is introduced throughout the embodiments of the present invention. Instead of selecting one of the neighbouring peers as recipient of a download request, and falling back on the streaming source if the download request cannot be satisfied by the selected neighbouring peer because of lack of available bandwidth, or if the selected neighbouring peer simply not is arranged at a level lower than that of the entering peer. If for any one of these reasons the download request cannot be satisfied by the selected neighbouring peer, the entering peer will send the download request to another one of the neighbouring peers included on the list of k peers provided by the tracker. If this particular neighbouring peer does not have available bandwidth, the entering peer will send the download request to a further neighbouring peer included in the list, and so on, until the entering peer is considered to have depleted its requests, whereupon it will fall back on the streaming source for the requested content. In practice, the tracker will have to stipulate an upper limit for the number of download requests that can be made to different neighbouring peers, as the delay from the time of sending the first download request to the point in time when the requested content actually can be rendered by the entering peer may become unacceptably long.

In this particular embodiment, it can be assumed that the download request made to the selected neighbouring peer in the respective one of the previously described embodiments constitutes a first round of download requesting. If the selected neighbouring peer is prevented from uploading the requested data content to the entering peer, either due to lack of free upload capacity or due to having a latency with respect to the real-time playing point of the streaming source which is equal to or greater than that determined for the entering peer, at least one further download request will be made to another neighbouring peer, i.e. a second round of download requesting will be undertaken. Typically, a maximum allowed number of download request that can be made will be determined in advance, or possibly on-the-fly if P2P network rules accepts such an approach. Hence, further rounds of download requesting to neighbouring peers will be made, either until the requested content actually is uploaded to the entering peer from a selected neighbouring peer, or that the maximum number of allowable requests have been reached, in which case the entering peer must fall back on the streaming source for content download, which is undesirable.

All peer selection policies of the previously described embodiments allow for multiple requesting to be made, except for the embodiments where the selected peer from which to download content is the peer being arranged at the level closest to that of the entering peer, which has to be updated to handle multiple requests. This is because of bias selection from the list of k neighbouring peers provided by the tracker in accordance with preference on selecting the closest peer being closest, which will affect the distribution of the k−1 remaining peers on the k-list, which violates assumptions made when previously calculating the probability $p_{ij}^c$. This will be set out in detail in the following.

Total probability mass between levels $d_i$ and $d_j$ is defined as $\eta_{i,j}$:

$$\eta_{i,j} = \sum_{w=j+1}^{i-1} p(d_w)$$

The probability that a peer at level $d_i$ will have a neighbor(s) in the $\eta_{i,j}$ region given that it has c neighbors in the $\alpha_i$ region is given by:

$$X_{i,j}^c(a) = \binom{c}{a}\left(\frac{\eta_{i,j}}{p_{\alpha_i}}\right)^a\left(1 - \frac{\eta_{i,j}}{p_{\alpha_i}}\right)^{c-a}$$

The probability that a peer at level $d_i$ will have v neighbouring peers out of totally c-a neighbouring peers at level $d_j$, given that it has c neighbouring peers in the $\alpha_i$ region is given by:

$$Q_j^c(a, v) = \binom{c-a}{v}\left(\frac{p(d_j)}{p_{\alpha_{j+1}}}\right)^v\left(1 - \frac{p(d_j)}{p_{\alpha_{j+1}}}\right)^{c-a-v}$$

Further:

$$\rho_{i,j}^{x,c} = \sum_{a=0}^{x-1}\left[X_{i,j}^c(a)\left(\sum_{v=x-a}^{c-a} Q_j^c(a, v)\right)\right] \quad (13)$$

$$\rho_{i,j}^x = \frac{\sum_{c=x}^{k}\binom{k}{c}(p_{\alpha_i})^c(1-p_{\alpha_i})^{k-c}\rho_{i,j}^{x,c}}{\sum_{j=1}^{\infty}\left(\sum_{c=x}^{k}\binom{k}{c}(p_{\alpha_i})^c(1-p_{\alpha_i})^{k-c}\rho_{i,j}^{x,c}\right)}$$

Due to the complexity in the calculation of Equation (13), an alternative recursive formula is suggested in order to reduce the computation complexity. A recursive formula of x for $p_{ij}^c$ reads:

$$\rho_{i,j}^{x+1,c} = \sum_{a=0}^{x}\left[X_{i,j}^c(a)\left(\sum_{v=x-a+1}^{c-a} Q_j^c(a, v)\right)\right]$$

$$\rho_{i,j}^{x+1,c} = \sum_{a=0}^{x}\left[X_{i,j}^c(a)\left(-Q_j^c(a, x-a) + \sum_{v=x-a}^{c-a} Q_j^c(a, v)\right)\right]$$

$$\rho_{i,j}^{x+1,c} = -\sum_{a=0}^{x}X_{i,j}^c(a)Q_j^c(a, x-a) + \sum_{a=0}^{x}X_{i,j}^c(a)\sum_{v=x-a}^{c-a} Q_j^c(a, v)$$

$$\rho_{i,j}^{x+1,c} = -\sum_{a=0}^{x}X_{i,j}^c(a)Q_j^c(a, x-a) + X_{i,j}^c(x)\sum_{v=0}^{c-a} Q_j^c(a, v) + \sum_{a=0}^{x-1}X_{i,j}^c(a)\sum_{v=x-a}^{c-a} Q_j^c(a, v)$$

$$\sum_{v=0}^{c-a} Q_j^c(a, v) = 1$$

$$\rho_{i,j}^{x+1,c} = -\sum_{a=0}^{x}X_{i,j}^c(a)Q_j^c(a, x-a) + X_{i,j}^c(x) + \rho_{i,j}^{x,c}$$

Note that $X_{i,j}^c(a)$ is not a function of x, so it will be used for all iterations and calculated once.

Let $$W_{i,j}^{x,c}(a) = X_{i,j}^c(a)Q_j^c(a, x-a)$$

$$W_{i,j}^{x,c} = \sum_{a=0}^{x}X_{i,j}^c(a)Q_j^c(a, x-a)$$

$$\rho_{i,j}^{x+1,c} = \rho_{i,j}^{x,c} - \sum_{a=0}^{x}W_{i,j}^{x,c}(a) + X_{i,j}^c(x)$$

The aim is to find a recursive formula of x for $W_{i,j}^{x,c}(a)$. Let $$\lambda_j = \frac{p(d_j)}{p_{\alpha_{j+1}}}$$

$$W_{i,j}^{x,c} = \sum_{a=0}^{x}X_{i,j}^c(a)\binom{c-a}{x-a}(\lambda_j)^{x-a}(1-\lambda_j)^{c-x}$$

$$W_{i,j}^{x+1,c} = \sum_{a=0}^{x+1}X_{i,j}^c(a)\binom{c-a}{x+1-a}(\lambda_j)^{x+1-a}(1-\lambda_j)^{c-x-1}$$

$$W_{i,j}^{x+1,c} = \sum_{a=0}^{x}X_{i,j}^c(a)\binom{c-a}{x+1-a}(\lambda_j)^{x+1-a}(1-\lambda_j)^{c-x-1} + X_{i,j}^c(x+1)(1-\lambda_j)^{c-x-1}$$

Factorial operation results in:

$$W_{i,j}^{x+1,c} = \sum_{a=0}^{x}X_{i,j}^c(a)\binom{c-a}{x-a}(\lambda_j)^{x-a}(1-\lambda_j)^{c-x}\left(\frac{\lambda_j}{1-\lambda_j}\right)\frac{c-x}{x-a+1} + X_{i,j}^c(x+1)(1-\lambda_j)^{c-x-1}$$

$$W_{i,j}^{x+1,c} = \sum_{a=0}^{x}W_{i,j}^{x,a}(a)\times\left(\frac{\lambda_j}{1-\lambda_j}\right)\frac{c-x}{x-a+1} + X_{i,j}^c(x+1)(1-\lambda_j)^{c-x-1}$$

Thus $$W_{i,j}^{x+1,c}(a) = \begin{cases} W_{i,j}^{x,c}(a)\times\left(\frac{\lambda_j}{1-\lambda_j}\right)\frac{c-x}{x-a+1} & a \leq x \\ X_{i,j}^c(x+1)(1-\lambda_j)^{c-x-1} & a = x+1 \end{cases}$$

Accordingly, a download request will comply with:

$$R_{iju}^x = \begin{cases} Np_i^x\rho_{iju}^x & \text{if } j \leq i - \delta \\ 0 & \text{otherwise} \end{cases}$$

where $$\rho_{iju}^x = \rho_{ij}^x\frac{p(u, d_j)}{p(d_j)}$$

Modifying Equation (12) to handle multiple download requests results in:

$$R_{iju}^x = \begin{cases} Np_i^x\hat{\rho}_{iju}^x & \text{if } j \leq i - \delta \\ 0 & \text{otherwise} \end{cases},$$

where

-continued $$\hat{p}_{iju}^x = \rho_{ij}^x \frac{u\ p(u, d_j)}{\sum_u u\ p(d_j)}.$$

For a given level $d_i$, the probability of having at least $r$ neighbouring peers in the $\alpha_i$ region is:

$$B_i(r) = \sum_{l=r}^{k} \binom{k}{l}(p_{\alpha_i})^l(1-p_{\alpha_i})^{k-l}$$

$$p_{\alpha_i} = \sum_{w=0}^{i-\delta} p(d_w)$$

In the first round of download requesting, at each level $d_i$ there are $N_i = p(d_i)N$ peers and of those peers, $N_{pi}^1 = B_i(1)N_i$ peers will make a download request to neighbouring peers that are closer to streaming source than the peers at level $d_i$.

Then, those $N_{pi}^1$ requesting peers will make $$R_{iju}^1 = \frac{p(u, d_j)}{p_{\alpha i}} N_{pi}^1$$

requests for data content from peers at level $d_j$, where $j \leq i-\delta$.

As previously has been described, the expected number of successful responses that peers at level $d_j$ and upload capacity $u$ make to download requests from neighbouring peers (i.e. the load on peers at level $d_j$ and upload capacity $u$) is:

$$L_{ju} = \left(\sum_{l=1}^{u} lB_{ju}(l) + u\left(1 - \sum_{l=0}^{u} B_{ju}(l)\right)\right)N_{ju}$$

where the total number of download requests that neighbouring peers make to peers at level $d_j$ and bandwidth $u$ is:

$$R_{ju} = \Sigma_i R_{iju}^1.$$

The expected number of successful download requests from peers at level $d_i$ to peers at the lower level $d_j$ will hence be $$S_{iju}^1 = L_{ju}^1 \frac{R_{iju}^1}{R_{ju}^1},$$

$$S_i^1 = \sum_j \sum_u S_{iju}^1$$

In a second round of download requesting, $N_{pi}^2 = B_i(2)(N_i - S_i^1)$ peers will make a download request to neighbouring peers that are closer to the streaming source than the peers at level $d_i$. Then, those $N_{pi}^2$ requesting peers will make $$R_{iju}^2 = \frac{p(u, d_j)}{p_{\alpha i}} N_{pi}^2$$

requests for data content from peers at level $d_j$. Thus, the total number of download requests that neighbouring peers make to peers at level $d_j$ and bandwidth $u$ is:

$$R_{ju} = \Sigma_i R_{iju}^1 + \Sigma_i R_{iju}^2,$$

and the expected number of successful download requests from peers at level $d_i$ to peers at the lower level $d_j$ will hence be $$S_{iju}^2 = (L_{ju}^2 - L_{ju}^1)\frac{R_{iju}^2}{R_{ju}^2}, S_i^2 = \sum_j \sum_u S_{iju}^2$$

In a third round of download requesting, $N_{pi}^3 = B_i(3)(N_i - S_i^1 - S_i^2)$ peers will make a download request to neighbouring peers that are closer to the streaming source than the peers at level $d_i$, and so on until either the requested data content has been successfully downloaded or the maximum number of download attempts have been reached (i.e. either the neighbouring peers have been depleted or a predetermined maximum number has been reached), wherein the streaming source will have to upload the requested data content.

Thus, by allowing multiple download attempts directed to neighbouring peers, in case a selected neighboring peer is prevented from uploading the requested data content, either due to exceeded latency requirements or due to lack of free upload capacity, a further neighbouring peer is approached and a download request is made to the further neighbouring peer. Should the further neighbouring peer be prevented from uploading the requested data, still a further neighbouring peer is approached, and so on. This will ultimately increase the expected probability that an entering peer actually will download the requested data content from any one of the k neighbouring peers on the list provided by the tracker. Analogously, the risk of having the entering peer fall back on the streaming server for requested data decreases, and the savings are consequently increased.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method at a tracker device, comprising a processing unit and a non-transitory computer readable medium, of arranging peer devices in a peer-to-peer (P2P) network comprising a streaming source and network peer devices arranged at distribution levels in the P2P network, wherein network peer devices at distribution levels closer to the streaming source have lower latencies than network peer devices at distribution levels farther from the streaming source, the method comprising:
   receiving, by the processing unit of the tracker device, a request from a peer device entering the network to receive data content;
   determining, by the processing unit of the tracker device, a distribution level in the P2P network at which the entering peer device is to be arranged with respect to the streaming source by sampling a distribution level from a conditional probability distribution, stored in the non-transitory computer readable medium, of distribution level and upload capacity for the network peer devices;
   arranging, by the processing unit of the tracker device, the entering peer at the determined distribution level in the P2P network; and providing, by the processing unit of the tracker device, the entering peer device with a plurality of peer devices selected, by the processing unit of the tracker device, from the network peer devices from which the requested data content can be downloaded with an expected probability depending on the determined distribution level, wherein the entering peer device is enabled to download, with the expected probability, the requested data content from a selected one of said plurality of peer devices, at a bandwidth corresponding to the upload capacity of said selected peer device, and in case the requested data content cannot be downloaded from said selected peer device, the entering peer device is enabled to download the requested data content from another selected peer device of the plurality of peer devices with another expected probability, at a bandwidth corresponding to the upload capacity of said another selected peer device.

2. The method of claim 1, wherein the entering peer device is enabled to request the data content from yet other selected peer devices of the plurality of peer devices either until the data content is successfully downloaded or a predetermined number of allowable data content requests is reached.

3. The method of claim 1, wherein the received request comprises upload capacity of the entering peer device.

4. The method of claim 1, said plurality of peer devices being selected among the network peer devices such that only peer devices arranged at a distribution level lower than that determined for the entering peer device are provided to the entering peer device.

5. The method of claim 1, said plurality of peer devices being selected among the network peer devices having been connected to the network less than a predetermined time period.

6. The method of claim 1, said plurality of peer devices being randomly selected among the network peer devices.

7. The method of claim 1, wherein the selected peer device of said plurality of peer devices is selected at random.

8. The method of claim 1, wherein the step of providing the entering peer device with a plurality of peer devices selected from the network peer devices further comprises:
indicating, by the processing unit of the tracker device, upload capacity of each of the plurality of peer devices, wherein the selected one of said plurality of peer devices is the peer device having a highest upload capacity.

9. The method of claim 1, wherein the step of providing the entering peer device with a plurality of peer devices selected from the network peer devices further comprises:
indicating, by the processing unit of the tracker device, the distribution level at which each of the plurality of peer devices is arranged, wherein in case two or more of the plurality of peer devices have the same upload capacity, said selected peer device is the peer device of the two or more peer devices being arranged at a distribution level closest to that determined for the entering peer device.

10. The method of claim 1, wherein the step of providing the entering peer device with a plurality of peer devices selected from the network peer devices further comprises:
indicating, by the processing unit of the tracker device, the distribution level of each of the plurality of peer devices, wherein the selected one of said plurality of peer devices is the peer device being arranged at a distribution level closest to that determined for the entering peer device.

11. The method of claim 10, wherein the step of providing the entering peer device with a plurality of peer devices selected from the network peer devices from which the requested data content can be downloaded further comprises:
indicating, by the processing unit of the tracker device, the upload capacity of each of the plurality of peer devices, wherein in case two or more of the plurality of peer devices are arranged at the closest distribution level, said selected peer device is the peer device of the two or more peer devices having a highest upload capacity.

12. The method of claim 1, wherein the probability that the entering peer device is capable of downloading the requested data content from a selected one of said plurality of peer devices is determined on the basis of the joint probability of the distribution level and upload capacity, which joint probability further is weighted with the upload capacity of the respective peer device of said plurality of peer devices.

13. The method of claim 1, further comprising:
estimating, by the processing unit of the tracker device, streaming source savings based on the expected probability that the entering peer device is able to download the requested data content.

14. The method of claim 13, wherein the estimated streaming source savings are determined as a sum of expected probabilities that the network peer devices are able to download a requested data content.

15. The method of claim 13, wherein the estimated streaming source savings are calculated as the ratio of successful network peer device downloads to total number of network peer devices.

16. A method at an entering peer device, comprising a processing unit and a non-transitory computer readable medium, of requesting data content in a peer-to-peer (P2P) network comprising a streaming source and a plurality of network peer devices arranged at distribution levels in the P2P network, wherein network peer devices at distribution levels closer to the streaming source have lower latencies than network peer devices at distribution levels farther from the streaming source, the method comprising:
sending, from the processing unit of the entering peer device, a request to a network supervising entity to receive data content;
receiving, by the processing unit of the entering peer device, an indication of a distribution level at which the entering peer device is to be arranged with respect to the streaming source, wherein the distribution level has been sampled from a conditional probability distribution of distribution level and upload capacity for the network peer devices, and a list indicating a plurality of peer devices selected from the network peer devices from which the requested data content can be downloaded with an expected probability depending on the determined distribution level;
sending, by the processing unit of the entering peer device, based on the arrangement of the peer device at the determined distribution level in the P2P network, a download request to a selected one of said plurality of peer devices, at a bandwidth corresponding to the upload capacity of said selected peer device, and in case the requested data content cannot be downloaded from said selected peer device, sending the download request to another selected peer device of the plurality of peer devices from which the requested data content can be downloaded with another expected probability; and downloading, by the processing unit of the entering peer device, the requested data content from said another selected peer device with said another expected probability, at a bandwidth corresponding to the upload capacity of said another selected peer device.

17. The method of claim 16, wherein the selected peer device of the plurality of peer devices to which the download request is sent is selected at random from said plurality of peer devices.

18. The method of claim 16, said list further indicating upload capacity of each of the plurality of peer devices, wherein the selected peer device of the plurality of peer devices to which the download request is sent is the peer device indicated to have a highest upload capacity.

19. The method of claim 18, wherein the list further indicates distribution level of each of the plurality of peer devices, and in case two or more of the plurality of peer devices are arranged at the closest distribution level, said selected peer device to which the download request is sent is the peer device of the two or more peer devices having a highest upload capacity.

20. The method of claim 16, said list further indicating the distribution level of each of the plurality of peer devices, wherein the selected peer device of the plurality of peer devices to which the download request is sent is the peer device indicated to be arranged at a distribution level closest to that determined for the entering peer device.

21. The method of claim 20, wherein the list further indicates upload capacity of each of the plurality of peer devices, and in case two or more of the plurality of peer devices are arranged at the closest distribution level, said selected peer device to which the download request is sent is the peer device of the two or more peer devices having a highest upload capacity.

22. The method of claim 16, further comprising:
filtering, by the processing unit of the peer device, out peer devices on the list arranged at a distribution level being lower than that of the entering peer device before sending the download request, wherein the download request will go to a selected one of the peer devices at a distribution level lower than that of the entering peer devices.

23. A tracker device for arranging peer devices in a peer-to-peer (P2P) network comprising a streaming source and network peer devices arranged at distribution levels in the P2P network, wherein network peer devices at distribution levels closer to the streaming source have lower latencies than network peer devices at distribution levels farther from the streaming source, the tracker device comprising a processing unit and a non-transitory computer readable medium being arranged to:
receive a request from a peer device entering the network to receive data content;
determine a distribution level in the P2P network at which the entering peer device is to be arranged with respect to the streaming source by sampling a distribution level from a conditional probability distribution of distribution level and upload capacity for the network peer devices;
arrange the entering peer at the determined distribution level in the P2P network; and
provide the entering peer device with a plurality of peer devices selected from the network peer devices from which the requested data content can be downloaded with an expected probability depending on the determined distribution level, wherein the entering peer device is enabled to download, with the expected probability, the requested data content from a selected one of said plurality of peer devices, at a bandwidth corresponding to the upload capacity of said selected peer device, and in case the requested data content cannot be downloaded from said selected peer device, the entering peer device is enabled to download the requested data content from another selected peer device of the plurality of peer devices with another expected probability, at a bandwidth corresponding to the upload capacity of said another selected peer device.

24. The tracker device of claim 23, wherein the entering peer device is enabled to request the data content from yet other selected peer devices of the plurality of peer devices either until the data content is successfully downloaded or a predetermined number of allowable data content requests is reached.

25. The tracker device of claim 23, wherein the received request comprises upload capacity of the entering peer device.

26. The tracker device of claim 23, the processing unit and the non-transitory computer readable medium further being arranged to select said plurality of peer devices among the network peer devices such that only peer devices arranged at a distribution level lower than that determined for the entering peer device are provided to the entering peer device.

27. The tracker device of claim 23, the processing unit and the non-transitory computer readable medium further being arranged to select said plurality of peer devices among the network peer devices having been connected to the network less than a predetermined time period.

28. The tracker device of claim 23, the processing unit and the non-transitory computer readable medium further being arranged to randomly select said plurality of peer devices among the network peer devices.

29. The tracker device of claim 23, wherein the entering peer device is enabled to download, with the expect probability, the requested data content from a randomly selected one of said plurality of peer devices.

30. The tracker device of claim 23, wherein the processing unit and the non-transitory computer readable medium further are arranged to, when providing the entering peer device with a plurality of peer devices selected from the network peer devices from which the requested data content can be downloaded:
indicate the upload capacity of each of the plurality of peer devices, wherein said selected peer device is the peer device having a highest upload capacity.

31. The tracker device of claim 30, the processing unit and the non-transitory computer readable medium further being arranged to indicate the distribution level at which each of the plurality of peer devices is arranged, wherein in case two or more of the plurality of peer devices have the same upload capacity, said selected peer device is the device peer of the two or more peer devices being arranged at a distribution level closest to that determined for the entering peer device.

32. The tracker device of claim 23, wherein the processing unit and the non-transitory computer readable medium further are arranged to, when providing the entering peer device with a plurality of peer devices selected from the network peer devices from which the requested data content can be downloaded:

indicate the distribution level at which each of the plurality of peer devices is arranged, wherein said selected peer device is the peer device arranged at a distribution level closest to that determined for the entering peer device.

33. The tracker device of claim 30, the processing unit and the non-transitory computer readable medium further being arranged to indicate the upload capacity of each of the plurality of peer devices, wherein in case two or more of the plurality of peer devices are arranged at the closest distribution level, said selected peer device is the peer device of the two or more peer devices having a highest upload capacity.

34. The tracker device of claim 23, wherein the probability that the entering peer device is capable of downloading the requested data content from a selected one of said plurality of peer devices is determined on the basis of the joint probability of the distribution level and upload capacity, which joint probability further is weighted with the upload capacity of the respective peer device of said plurality of peer devices.

35. The tracker device of claim 23, the processing unit and the non-transitory computer readable medium further being arranged to estimate streaming source savings based on the expected probability that the entering peer device is able to download the requested data content.

36. The tracker device of claim 35, the processing unit and the non-transitory computer readable medium further being arranged to estimate the streaming source savings as a sum of expected probabilities that the network peer devices are able to download a requested data content.

37. The tracker device of claim 35, the processing unit and the non-transitory computer readable medium further being arranged to estimate the streaming source savings as the ratio of successful network peer downloads to total number of network peer devices.

38. A peer device for requesting data content in a peer-to-peer (P2P) network comprising a streaming source and a plurality of network peer devices arranged at distribution levels in the P2P network, wherein network peer devices at distribution levels closer to the streaming source have lower latencies than network peer devices at distribution levels farther from the streaming source, the peer device comprising a processing unit and a non-transitory computer readable medium being arranged to:
send a request to a network supervising entity to receive data content;
receive an indication of a distribution level at which the peer device is to be arranged with respect to the streaming source, wherein the distribution level has been sampled from a conditional probability distribution of distribution level and upload capacity for the network peer devices, and a list indicating a plurality of peer devices selected from the network peer devices from which the requested data content can be downloaded with an expected probability depending on the determined distribution level;
send, based on the arrangement of the peer device at the determined distribution level in the P2P network, a download request to a selected one of said plurality of peer devices, at a bandwidth corresponding to the upload capacity of said selected peer device, and in case the requested data content cannot be downloaded from said selected peer, send the download request to another selected peer device of the plurality of peer devices from which the requested data content can be downloaded with another expected probability; and
download the requested data content from said another selected peer device with said another expected probability, at a bandwidth corresponding to the upload capacity of said another selected peer device.

39. The peer device of claim 38, wherein the selected peer device of the plurality of peer devices to which the download request is sent is selected at random from said plurality of peer devices.

40. The peer device of claim 38, said list further indicating upload capacity of each of the plurality of peer devices, wherein the selected peer device of the plurality of peer devices to which the download request is sent is the peer device indicated to have a highest upload capacity.

41. The peer device of claim 40, wherein the list further indicates distribution level of each of the plurality of peer devices, and in case two or more of the plurality of peer devices are arranged at the closest distribution level, said selected peer device to which the download request is sent is the peer device of the two or more peer devices having a highest upload capacity.

42. The peer device of claim 38, said list further indicating the distribution level of each of the plurality of peer devices, wherein the selected peer device of the plurality of peer devices to which the download request is sent is the peer device indicated to be arranged at a distribution level closest to that determined for the entering peer device.

43. The peer device of claim 42, wherein the list further indicates upload capacity of each of the plurality of peer devices, and in case two or more of the plurality of peer devices are arranged at the closest distribution level, said selected peer device to which the download request is sends the peer device of the two or more peer devices having a highest upload capacity.

44. The peer device of claim 38, the processing unit and the non-transitory computer readable medium further being arranged to:
filter out peer devices on the list arranged at a distribution level being lower than that of the entering peer device before sending the download request, wherein the download request will go to a selected one of the peer devices at a distribution level lower than that of the entering peer devices.

* * * * *